US009352912B2

(12) United States Patent
Klos

(10) Patent No.: US 9,352,912 B2
(45) Date of Patent: May 31, 2016

(54) SYSTEM AND METHOD OF ALIGNING ITEMS ON A CONVEYOR

(76) Inventor: Kimberly Klos, Carlsbad, CA (US)

( * ) Notice: Subject to any disclaimer, the term of this patent is extended or adjusted under 35 U.S.C. 154(b) by 1496 days.

(21) Appl. No.: 12/581,681

(22) Filed: Oct. 19, 2009
(Under 37 CFR 1.47)

(65) Prior Publication Data

US 2011/0138752 A1 Jun. 16, 2011

Related U.S. Application Data

(63) Continuation of application No. 12/398,152, filed on Mar. 4, 2009, now abandoned.

(60) Provisional application No. 61/033,789, filed on Mar. 4, 2008.

(51) Int. Cl.
*B65B 1/04* (2006.01)
*B65G 47/22* (2006.01)
*B65G 47/244* (2006.01)

(52) U.S. Cl.
CPC .............. *B65G 47/22* (2013.01); *B65G 47/244* (2013.01)

(58) Field of Classification Search
USPC .................................................... 53/544, 534
See application file for complete search history.

(56) References Cited

U.S. PATENT DOCUMENTS

| | | | |
|---|---|---|---|
| 1,571,908 A | 2/1926 | Menzies | |
| 1,966,669 A | 7/1934 | Johnson | |
| 2,638,211 A | 5/1953 | Spurr | |
| 2,690,733 A * | 10/1954 | Eger | 118/503 |
| 2,927,412 A * | 3/1960 | Hayes et al. | 53/377.5 |
| 3,173,540 A | 3/1965 | Lapides | |
| 3,463,566 A * | 8/1969 | Powers | 414/273 |
| 3,476,265 A * | 11/1969 | Powers | 198/614 |
| 3,692,264 A | 9/1972 | Burkhard et al. | |
| 4,304,353 A * | 12/1981 | Stollberg | 229/126 |
| 4,331,434 A * | 5/1982 | Buschor | 493/67 |
| 4,432,456 A | 2/1984 | Ovadia et al. | |
| 4,606,460 A | 8/1986 | Luray | |
| 4,618,069 A | 10/1986 | Quong | |
| 4,645,122 A * | 2/1987 | Nederveld | 206/509 |
| 4,852,743 A | 8/1989 | Ridgeway | |
| 4,903,827 A | 2/1990 | Phelps et al. | |
| 4,923,065 A | 5/1990 | Ridgeway | |
| 4,965,981 A * | 10/1990 | Kikuchi | 53/142 |
| 5,042,233 A * | 8/1991 | Huang et al. | 53/468 |
| 5,056,665 A | 10/1991 | Boecker et al. | |
| 5,071,009 A | 12/1991 | Ridgeway | |
| 5,221,005 A | 6/1993 | Hayward | |
| 5,251,760 A | 10/1993 | Smith et al. | |
| 5,287,968 A | 2/1994 | Ridgeway | |
| 5,388,701 A | 2/1995 | Ridgeway | |
| 5,542,537 A | 8/1996 | Ford | |
| 5,669,506 A | 9/1997 | Lofgren et al. | |
| 5,678,695 A | 10/1997 | Ridgeway et al. | |

(Continued)

OTHER PUBLICATIONS

Millican, All Wrapped Up, Ready to Prosper: Packaging: Transporting fragile goods becomes easier with inventor's system, Los Angeles Times, Jun. 26, 1990.

*Primary Examiner* — Nathaniel Chukwurah
(74) *Attorney, Agent, or Firm* — Clayton, Howarth & Cannon, P.C.

(57) ABSTRACT

A packaging system and method is disclosed for use with a conveyance system. The package assembly provides protrusions which keep the assembly properly oriented on a conveyor system.

3 Claims, 26 Drawing Sheets

(56) References Cited

U.S. PATENT DOCUMENTS

| | | |
|---|---|---|
| 5,722,541 A | 3/1998 | Lofgren et al. |
| 5,862,914 A | 1/1999 | Farison et al. |
| 5,893,462 A | 4/1999 | Ridgeway |
| 5,894,932 A | 4/1999 | Harding et al. |
| 5,912,058 A | 6/1999 | Takahashi et al. |
| 5,967,327 A | 10/1999 | Jones |
| 5,975,307 A | 11/1999 | Harding et al. |
| 6,006,917 A | 12/1999 | Loeffler |
| 6,010,006 A | 1/2000 | Ridgeway et al. |
| 6,073,761 A | 6/2000 | Jones |
| 6,148,590 A | 11/2000 | Ridgeway et al. |
| 6,148,591 A | 11/2000 | Ridgeway et al. |
| 6,170,659 B1 | 1/2001 | Hunter |
| 6,223,901 B1 | 5/2001 | Lofgren et al. |
| 6,289,655 B1 | 9/2001 | Ridgeway et al. |
| 6,302,274 B1 | 10/2001 | Ridgeway |
| 6,311,844 B1 | 11/2001 | Ridgeway et al. |
| 6,354,487 B1* | 3/2002 | Muise, Jr. ............... 229/125.28 |
| 6,386,388 B1* | 5/2002 | Overholt ...................... 220/608 |
| 6,467,624 B1 | 10/2002 | Lofgren et al. |
| 6,502,698 B1* | 1/2003 | McKenna et al. ............. 206/509 |
| 6,648,134 B2 | 11/2003 | Gordon et al. |
| 6,675,973 B1 | 1/2004 | McDonald et al. |
| 6,817,161 B1 | 11/2004 | Wu et al. |
| 6,880,706 B2 | 4/2005 | Braconnot et al. |
| 6,899,229 B2 | 5/2005 | Dennison et al. |
| 6,913,147 B2 | 7/2005 | Mueller et al. |
| 6,920,981 B2 | 7/2005 | Lofgren et al. |
| 6,942,101 B2 | 9/2005 | Lofgren et al. |
| 7,025,195 B2* | 4/2006 | Brixius et al. ............... 198/787 |
| 7,086,534 B2 | 8/2006 | Roesel et al. |
| 7,150,356 B2 | 12/2006 | Lofgren et al. |
| 7,290,662 B2 | 11/2007 | Lofgren et al. |
| 7,296,681 B2 | 11/2007 | McDonald et al. |
| 7,299,926 B2 | 11/2007 | Russell et al. |
| 2002/0144926 A1 | 10/2002 | Rutledge |
| 2005/0075230 A1* | 4/2005 | Moshier et al. ................. 493/51 |
| 2006/0243783 A1* | 11/2006 | Spivey et al. ............... 229/117.3 |
| 2007/0051652 A1 | 3/2007 | Tilton |
| 2007/0194093 A1* | 8/2007 | Ford ............................. 229/144 |
| 2008/0029419 A1 | 2/2008 | Applebaum |
| 2008/0223750 A1 | 9/2008 | McDonald et al. |
| 2010/0031868 A1 | 2/2010 | Suda et al. |
| 2010/0064636 A1* | 3/2010 | Ford ............................. 53/458 |
| 2011/0259916 A1* | 10/2011 | Spivey et al. ................. 222/105 |

\* cited by examiner

SYSTEM AND METHOD OF ALIGNING ITEMS ON A CONVEYOR

CROSS-REFERENCE TO RELATED APPLICATIONS

This application is a continuation of U.S. application Ser. No. 12/398,152, filed Mar. 4, 2009, which claims the benefit of U.S. Provisional Application No. 61/033,789, titled SYSTEM AND METHOD OF ALIGNING ITEMS ON A CONVEYOR, filed Mar. 4, 2008, which are hereby incorporated by reference herein in their entirety, including but not limited to those portions that specifically appear hereinafter, the incorporation by reference being made with the following exception: In the event that any portion of the above-referenced applications are inconsistent with this application, this application supercedes said above-referenced applications.

STATEMENT REGARDING FEDERALLY SPONSORED RESEARCH OR DEVELOPMENT

Not Applicable.

BACKGROUND

1. The Field of the Invention

This disclosure is directed to a conveyor system and a conveying method. In particular, the disclosure is directed to systems and methods for aligning items on a conveyor and structures attached to items for aiding in the alignment.

2. The Background Art

Systems and methods for aligning items on a conveyor are dependent on the weight of the package being conveyed and the frictional coefficients of the package surfaces and the finish of the rollers making up the conveyor. Lighter containers provide less frictional interaction and the container is less likely to be pressed against the rollers in a consistent manner. Additionally, smaller packages may disproportionally distribute weight on a single roller rather than spreading the weight along many rollers and thereby will transmit irregularities and imbalances to the package causing it to change orientation. This is particularly noticeable in the corners on conveyors where the axis of the rollers are set non-parallel to each other.

Protective packaging devices are often used to protect goods from shocks and impacts during shipping or transportation. For example, when transporting articles such as electronics, it is often desirable to cushion the article inside a container to protect the article from a physical impact that may occur to the container and that can occur during transit and/or display in a retail environment. In addition, when shipping articles such as computer components, it is often desirable to protect those components from dust and dirt. Because of these considerations the items being packaged must be placed carefully in the package and an aligned package makes for easier packaging.

In most cases, some additional structure is used to keep the article from moving uncontrollably in the container and thus incurring damage. Such additional structures include paper or plastic packing material, structured plastic foams, foam-filled cushions and the like. Ideally, the article to be packaged is spaced away from the walls defining the container, thus protecting the article from other foreign objects which may impact or compromise the outer walls of the container. These packaging structures are easier to place into an aligned container.

During the assembly of the container with contents therein, placement of the items relative to the container is important for an automated system. Automated systems provide efficiencies of scale during large product shipping runs. Automated conveyor systems often rely on the relative alignment of the components for packaging whether the packaging is done by machine or manually.

For purposes of summarizing the embodiments and the advantages achieved over the prior art, certain objects and advantages of the embodiments may have been described herein. It is within the scope of the disclosure that not necessarily all such objects or advantages may be achieved in accordance with any particular embodiment. Thus, for example, those skilled in the art will recognize that the embodiments may be embodied or carried out in a manner that achieves or optimizes one advantage or a group of advantages as taught herein without necessarily achieving other objects or advantages as may be taught or suggested herein.

All of the embodiments described herein are intended to be within the scope of the disclosure disclosed herein. These and other embodiments will become readily apparent to those skilled in the art from the following detailed description of the preferred embodiments, each having references to the accompanying figures. Noting that the invention is not being limited to any particular preferred embodiments herein disclosed.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
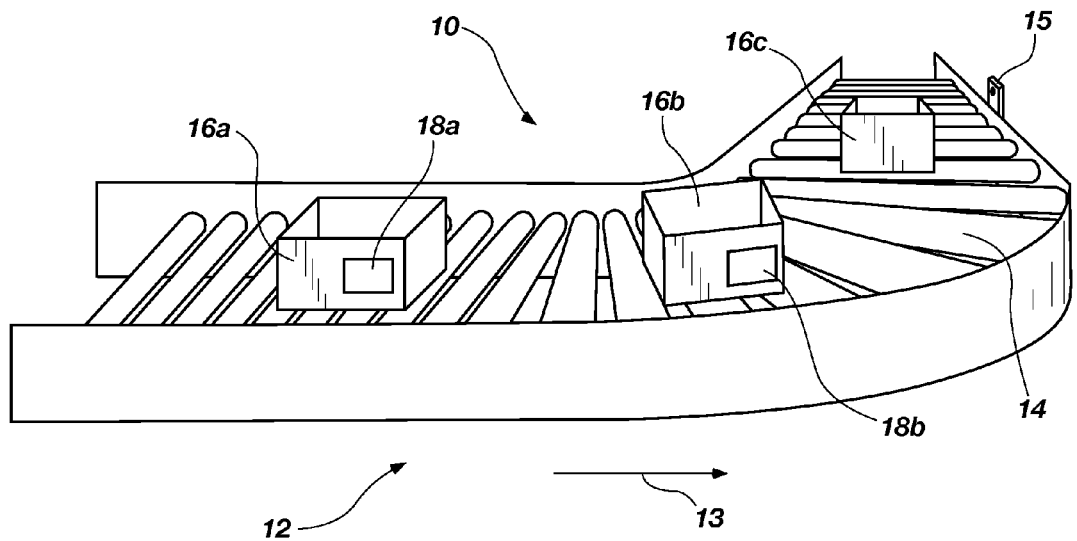
FIG. 1 illustrates an embodiment of a conveyor system for packages with labels and an automated reader.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. In describing and claiming the present disclosure, the following terminology will be used in accordance with the definitions set out below. As used herein, the terms "comprising," "including," "containing," "characterized by," and grammatical equivalents thereof are inclusive or open-ended terms that do not exclude additional, unrecited elements or method steps.

Referring now to FIG. 1, there is shown an illustrative embodiment of a conveyor system 10. The conveyor system 10 may include a conveyor 12 to move a container 16 along a path in the direction indicated by the arrow 13. Conveyor 12 may include cylindrical rollers 14 as shown, or it may include wheels on axles or a conveyor belt. The containers 16 move along the conveyor 12 on the rollers 14. The containers 16 may include labels 18 for providing information. Conveyor system 10 may further include an electronic reader or scanner 15 that is configured to read the labels 18 on the packages 16 as they are conveyed. Containers 16 may be placed on to the conveyor as represented by container 16a. Container 16a may be placed such that scanner 15 can scan label 18a. During conveyance the orientation may change with regard to the container 16, the label 18 and the scanner 15. At a certain location as shown with container 16b and label 18b the orientation is changing relative to the scanner 15. At a location indicated by container 16c it is in position to pass by a scanner 15 such that the label 18 may be scanned.

Figure 2:
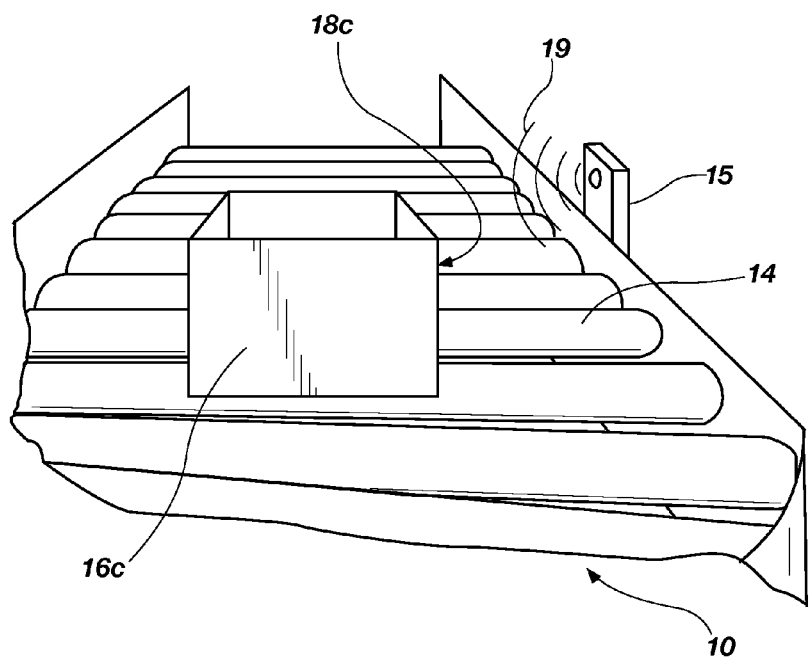
FIG. 2 illustrates a perspective view of a conveyor system.

The container in the position shown in FIG. 2 by a container 16c having a label 18c disposed facing toward the scanner 15. Scanner 15 may emit an electromagnetic signal that reacts with the label 18a to generate information in the system 10.

Figure 3:
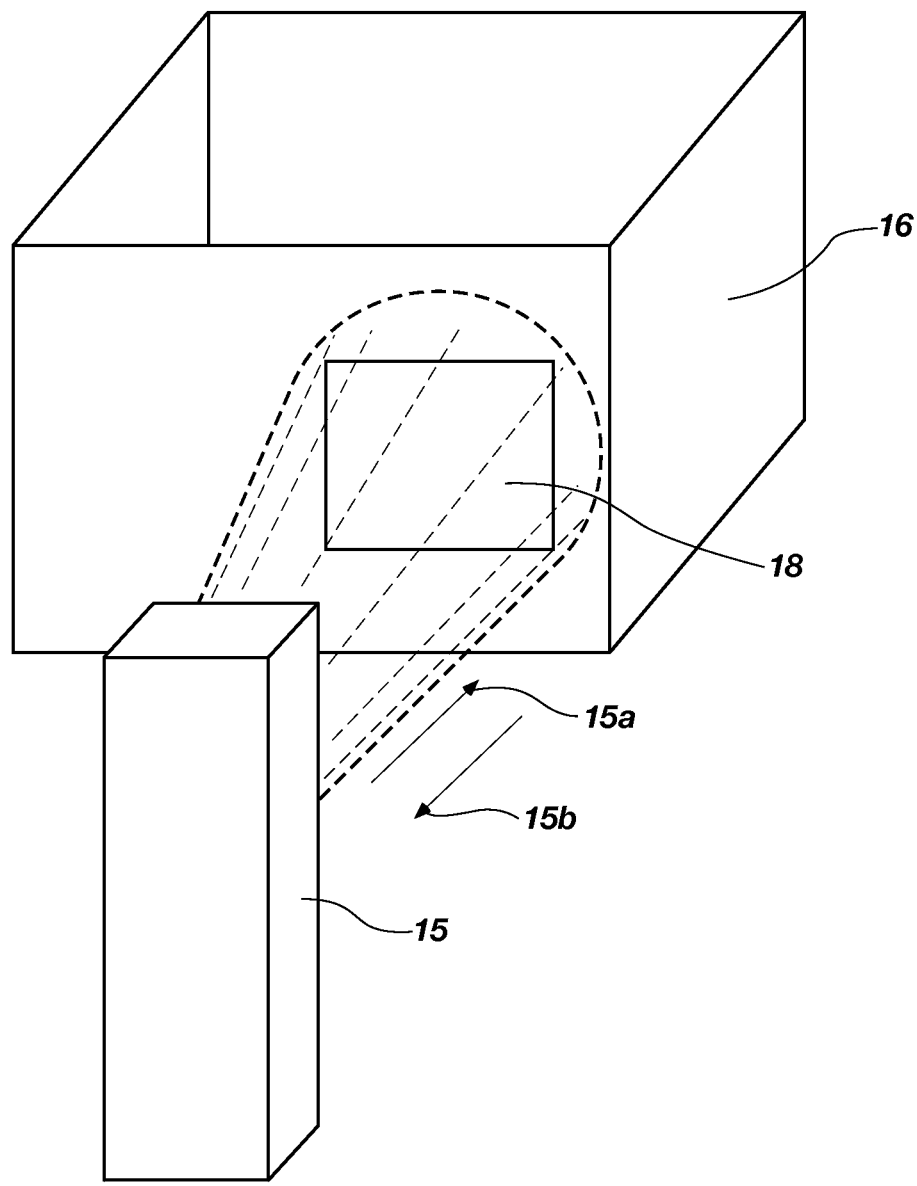
FIG. 3 illustrates an embodiment of a method for assembling a conveyor system.

As can be seen in FIG. 3, the scanner may be an active scanner configured to first transmit a signal 15a and receive a returned or reflected signal 15b from the label 18. The label 18 maybe a bar code or pattern that reflects from the label 18 back to scanner 15 or it may be a transceiver device that is energized by the signal 15a and subsequently transmits a response signal 15b. One exemplary transceiver is known in the art as RFID chips.

Figure 4:
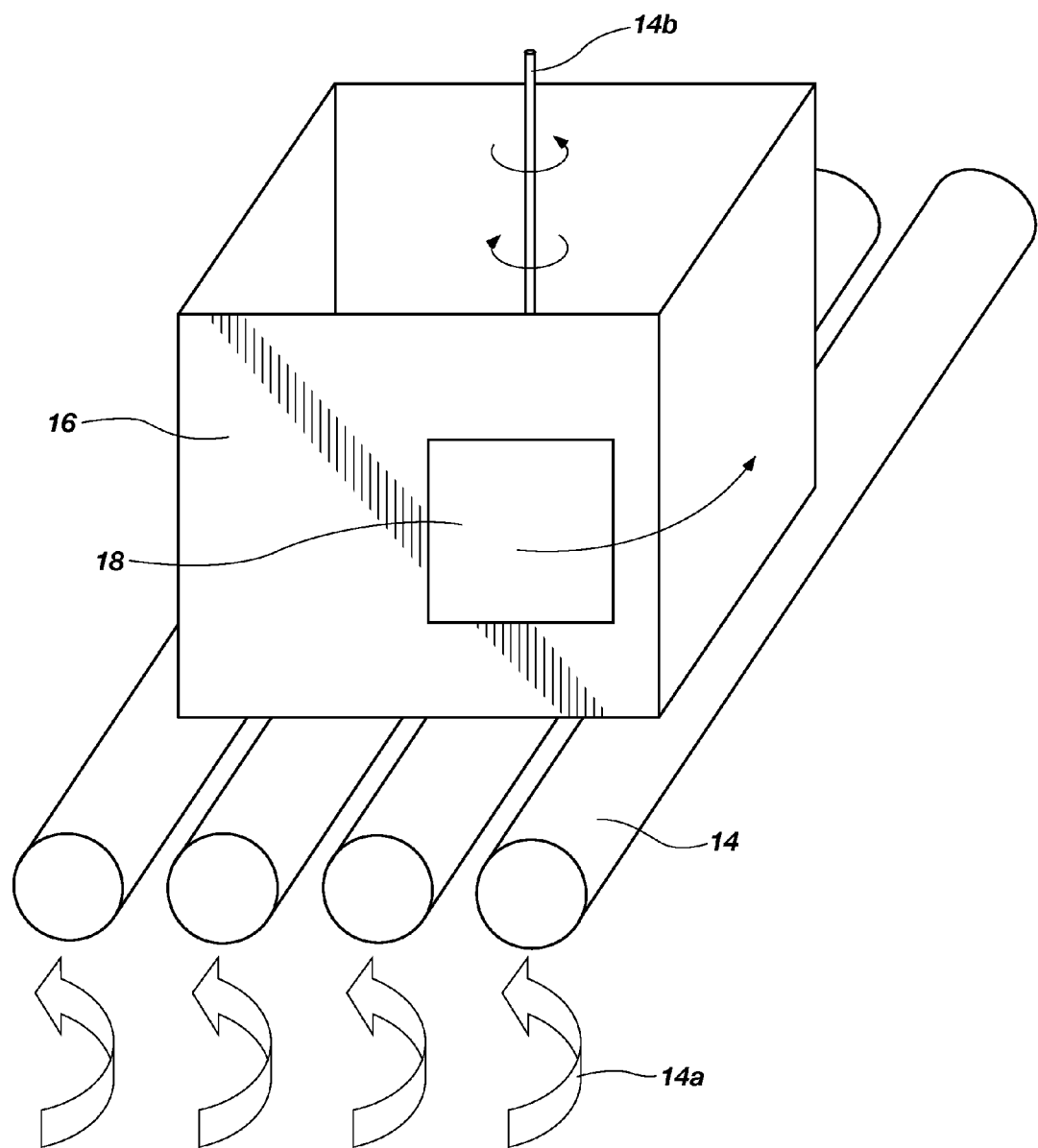
FIG. 4 illustrates a drawback in some package and conveyor systems.

As shown in FIG. 4, the rollers 14 rotate consistent to the arrows 14a. Container 16 of may rotate round an axis 14b due in part to irregularities in surface contact with the rollers 14. This rotation may cause the label 18 to turn away from its desired orientation.

Figures 5A, 5B, 5C:
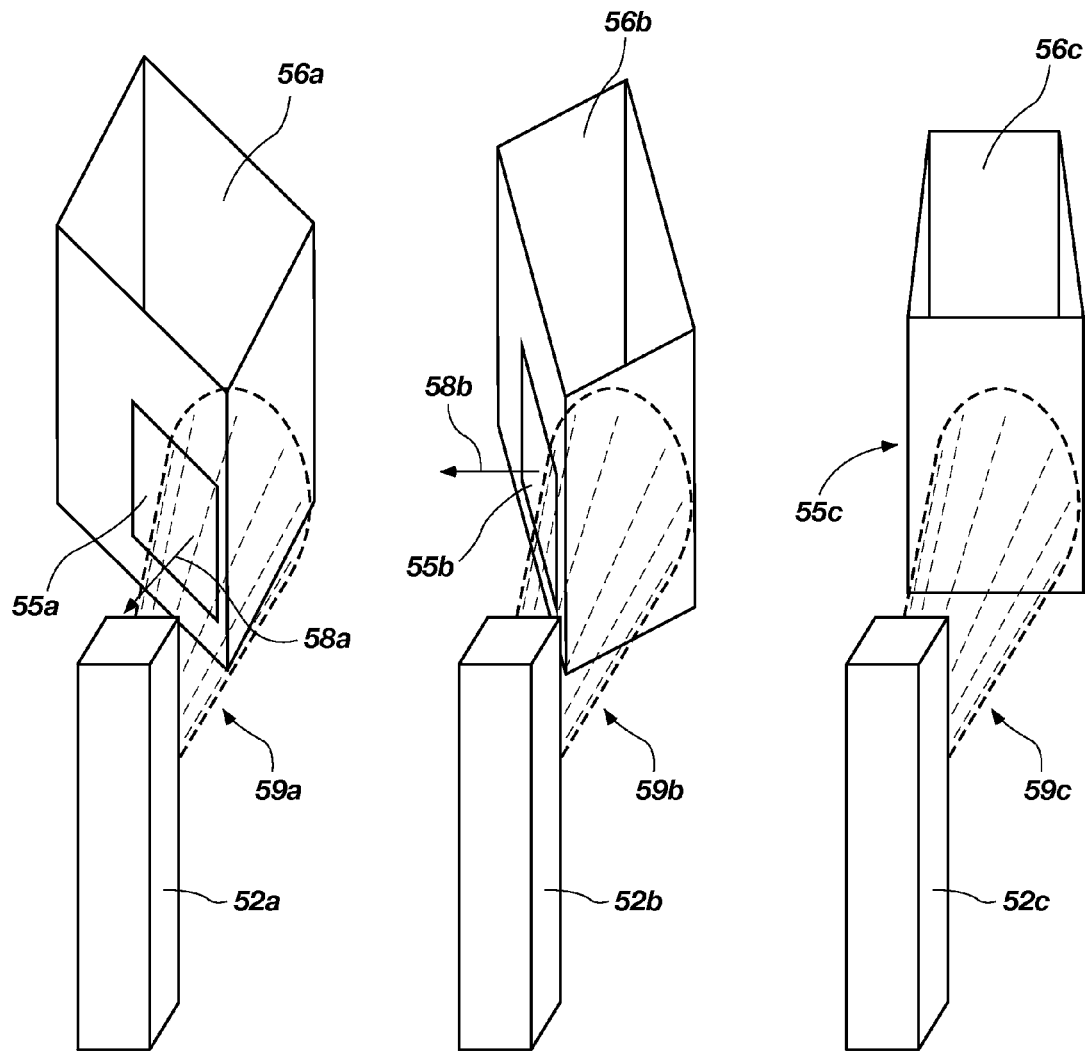
FIGS. 5a to 5c illustrate a drawback in some package and conveyor systems.

Referring now to FIGS. 5a, 5b, and 5c, the limitations of standard scanners will be discussed. FIG. 5a shows a scanner 52a partially scanning a label 55a on container 56a with a beam 59a of electromagnetic energy. For the scanner 59a to properly identify the container 56a a certain portion of the beam 59a must be reflected back toward the scanner 59a. At the orientation shown in FIG. 5a the beam may reflect back enough of beam 58b to the scanner 52a to provide the needed information.

FIG. 5b shows a scanner 52b partially scanning a label 55b on container 56b with a beam 59b of electromagnetic energy. For the scanner 52b to properly identify the container 56b, a certain portion of the beam 59b must be reflected back toward the scanner 52b. At the orientation shown in FIG. 5b the beam 59b may not reflect back enough of beam 58b toward scanner 52b to provide the needed information.

FIG. 5c shows a scanner 52c partially scanning a label 55c on container 56c with a beam 59c of electromagnetic energy. For the scanner 52c to properly identify the container 56c, a certain portion of the beam 59c must be reflected back toward the scanner 52c. At the orientation shown in FIG. 5c the beam will not reflect back enough of beam 58c toward scanner 52c to provide the needed information.

Figure 6:
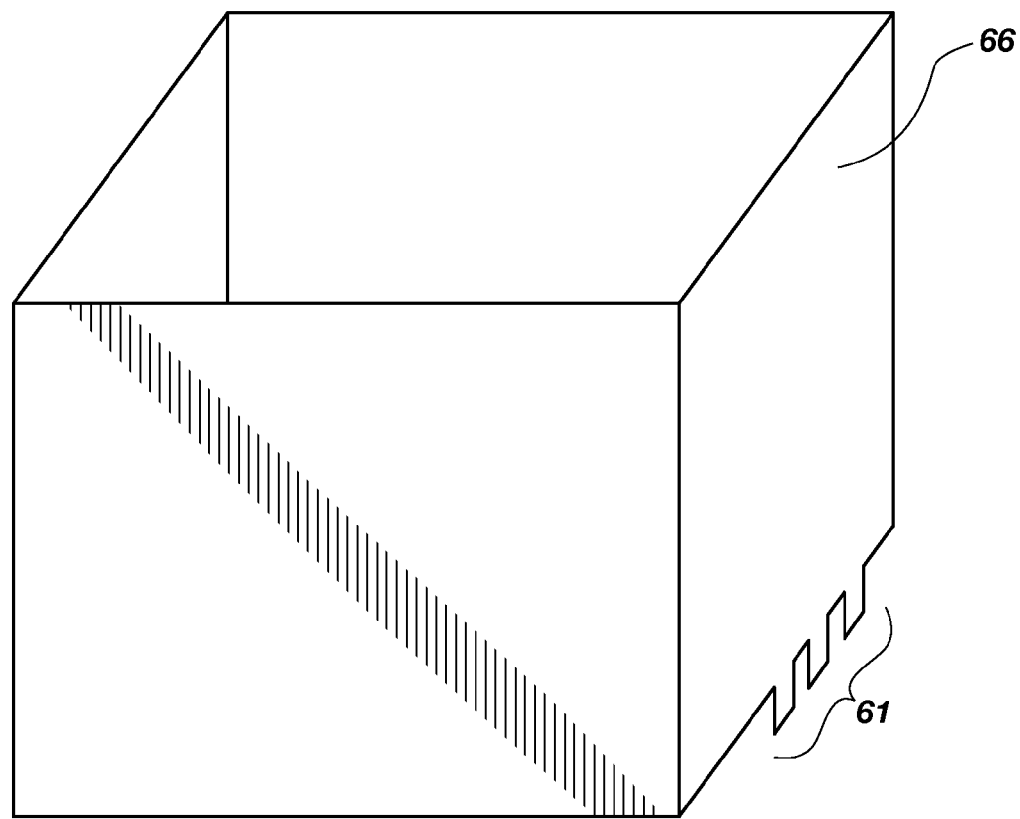
FIG. 6 illustrates an exemplary embodiment of a system for aligning items on a conveyor.

Referring now to FIG. 6, an embodiment of a container 66 having structures for controlling orientation will be discussed. The container 66 may have structures added thereto that will allow it to physically communicate within a system to stay oriented. A structure may be a tab or protrusion located on the container 66. The protrusions may be a conveyor foot 61 extending from the bottom of the container 66. The conveyor feet 61 may be a singular foot or may be a plurality of feet as shown in the figure.

Figure 7:
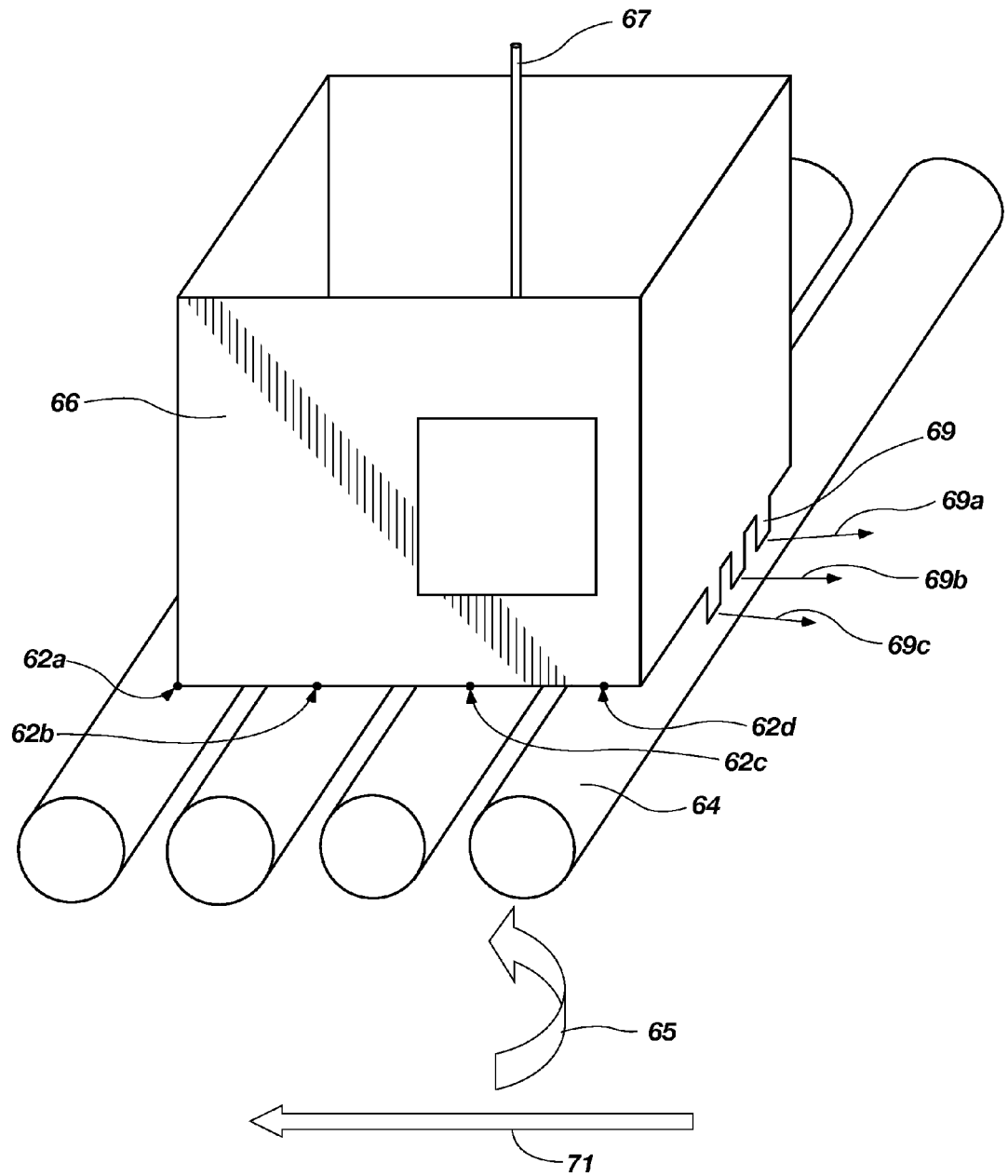
FIG. 7 illustrates an exemplary embodiment of a system for aligning items on a conveyor.

Referring now to FIG. 7, an embodiment of the operation of the conveyor foot will be discussed for forces and motion with in a system. As container 66 moves in the direction indicated by arrow 71 on rollers 64 it may experience a rotational force around axis 67 that would cause the container 66 to rotate if not provided with a stabilizing or counter force. The rollers 64 interact with the package along lines indicated by their associated end points 62a, 62b, 62c, and 62d. This interaction is dependent on the weight of the package and the frictional coefficients of the package 66 surfaces and the roller 64 finish. Lighter containers provide less frictional interaction and the container is less likely to be pressed against the rollers in a consistent manner. Additionally, smaller packages may disproportionally distribute weight on a single roller rather than spreading the weight along many rollers, and any given roller therefore will transmit any irregularities it may have to the package causing it to change orientation. This is particularly noticeable in corners on conveyors where the axis of the rollers are set non-parallel to each other.

The conveyor feet 69 added to container 66 provide stabilizing forces 69a, 69b, and 69c to counteract rotation of the package 66. The forces 69a, 69b, and 69c are created as conveyor feet 69 impact rollers 64 at locations that transmit a vectored force generally opposite the direction of travel 71. The distance between axis 67 and the conveyor feet provide a determinal magnitude of the moment of rotation force that resists the moments of rotation acting at various locations along contact lines 62a, 62b, 62c, and 62d. The feet can be sized and shaped to control this vectored force and the structures in the embodiment may be exaggerated as to size and shape for illustrative purposes.

Figure 8:
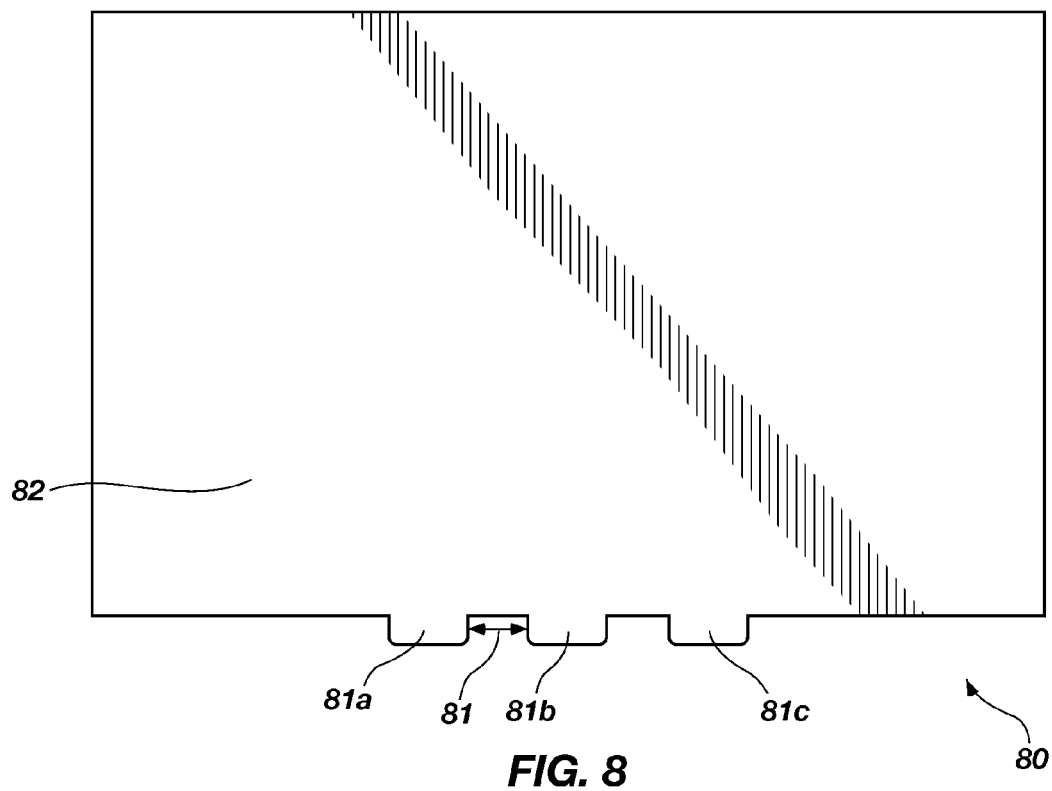
FIG. 8 illustrates an exemplary embodiment of a system for aligning items on a conveyor.

Referring now to FIG. 8, an embodiment illustrating a spacing 81 of conveyor feet 81a, 81b and 81c on package 82 is portrayed. The spacing 81 of the conveyor feet can be predetermined to provide the desired alignment for various combinations of conveyors such as belts, rollers, cylinders and slides.

Figure 9:
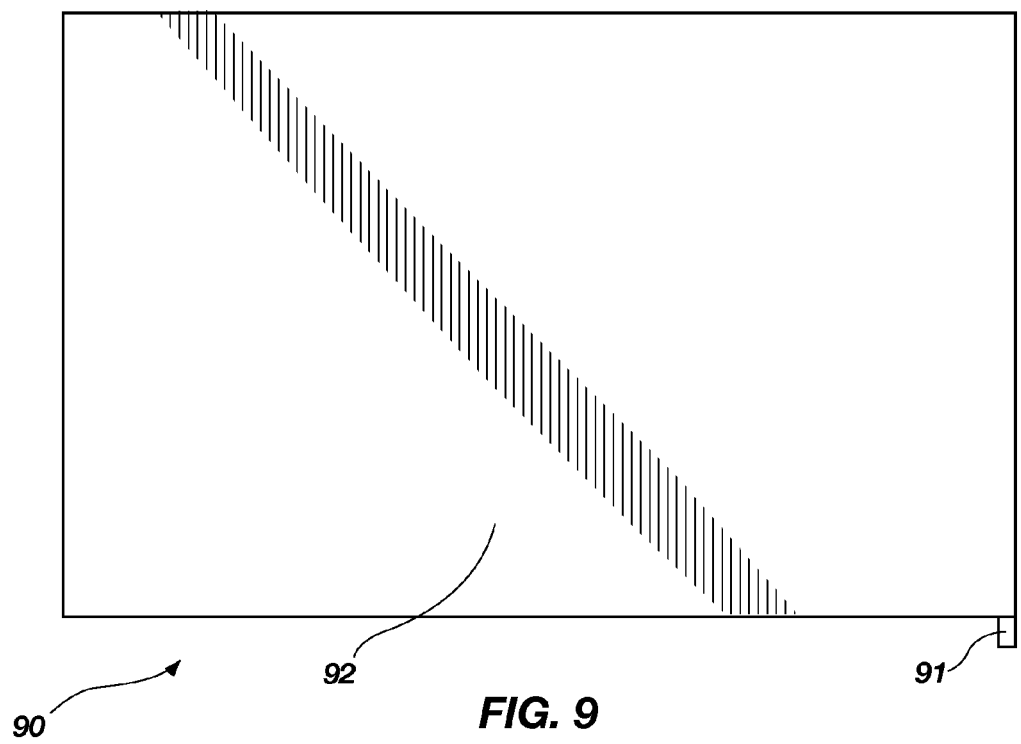
FIG. 9 illustrates an exemplary embodiment of a system for aligning items on a conveyor.

Referring now to FIG. 9, an embodiment illustrating a sizing of conveyor feet 91 on package 92. The sizing of the conveyor feet can be predetermined to provide the desired alignment for various combinations of conveyors such as belts, rollers, cylinders and slides.

Figure 10:
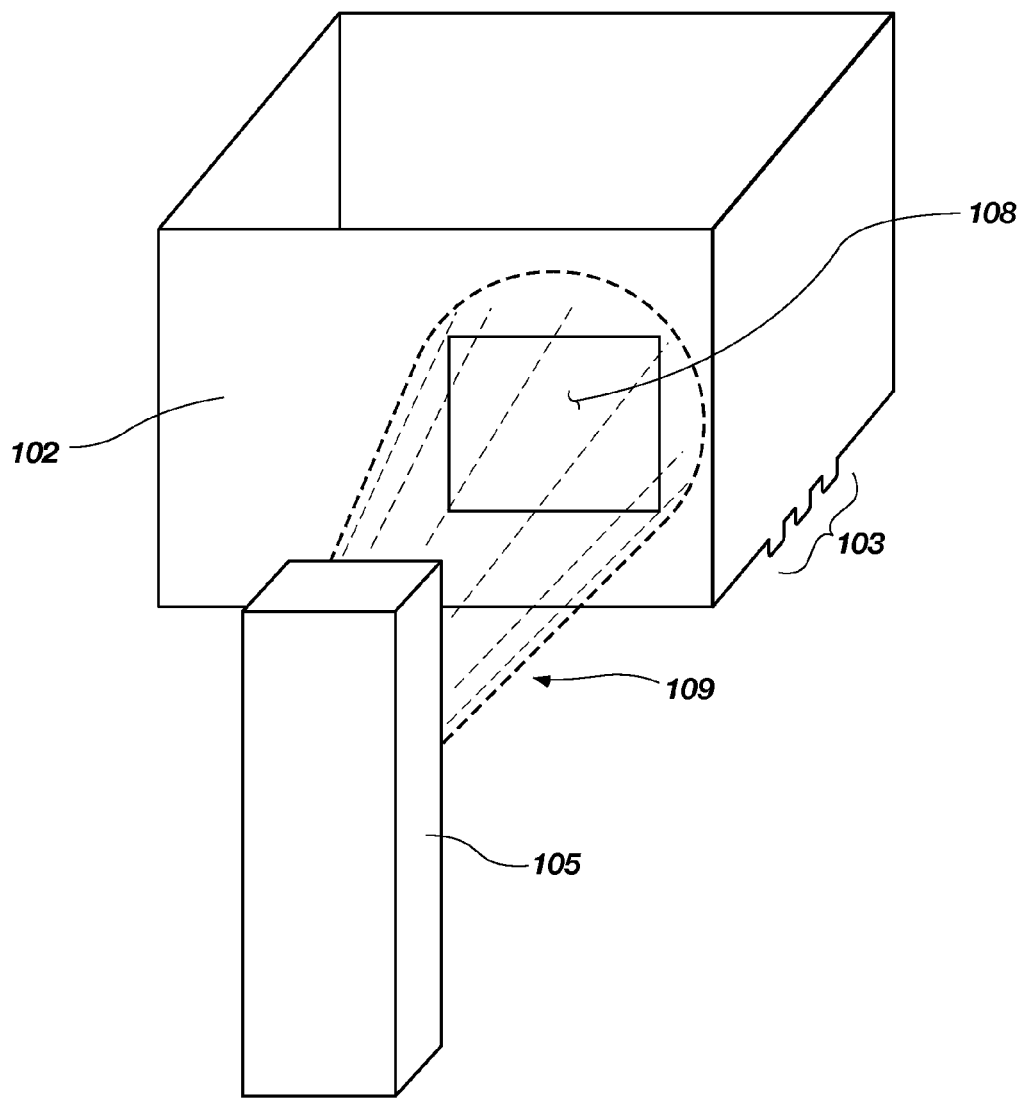
FIG. 10 illustrates an exemplary embodiment of a system for aligning items on a conveyor.

Referring now to FIG. 10, an embodiment illustrating a relative placement of the conveyor feet 103 relative to a scanning system 105 using electronic radiation 109 on a conveyed package 102 for reading label 108. Placement of the conveyor feet 103 can be predetermined to provide the desired alignment for various components for the scanner 105.

Figure 11:
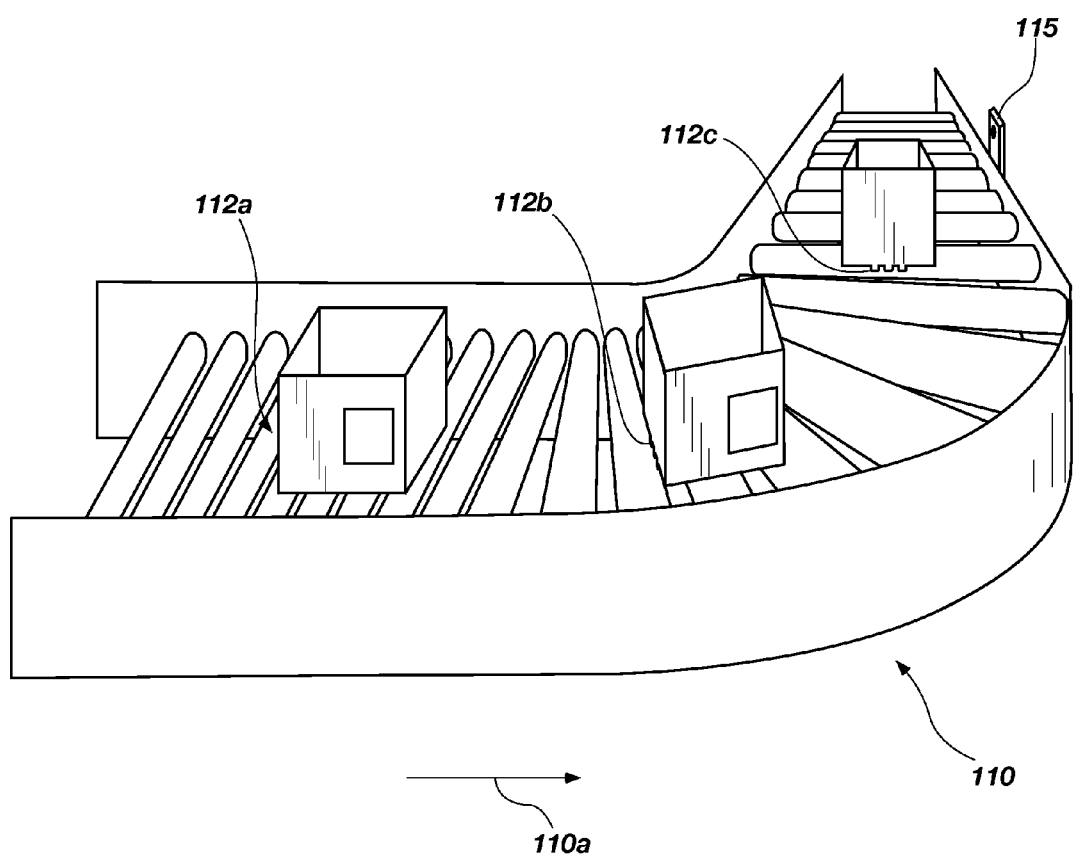
FIG. 11 illustrates an exemplary embodiment of a system for aligning items on a conveyor.

Referring now to FIG. 11, an embodiment illustrating a conveyor foot 112 in use where 112a represents the initial placement and where 112b is a medial misalignment being corrected and where 112c illustrates the placement of the conveyor feet as the container approaches scanner 115. The conveyor feet can be configured to provide the desired alignment for various combinations of conveyors such as belts, rollers, cylinders and slides.

Figure 12:
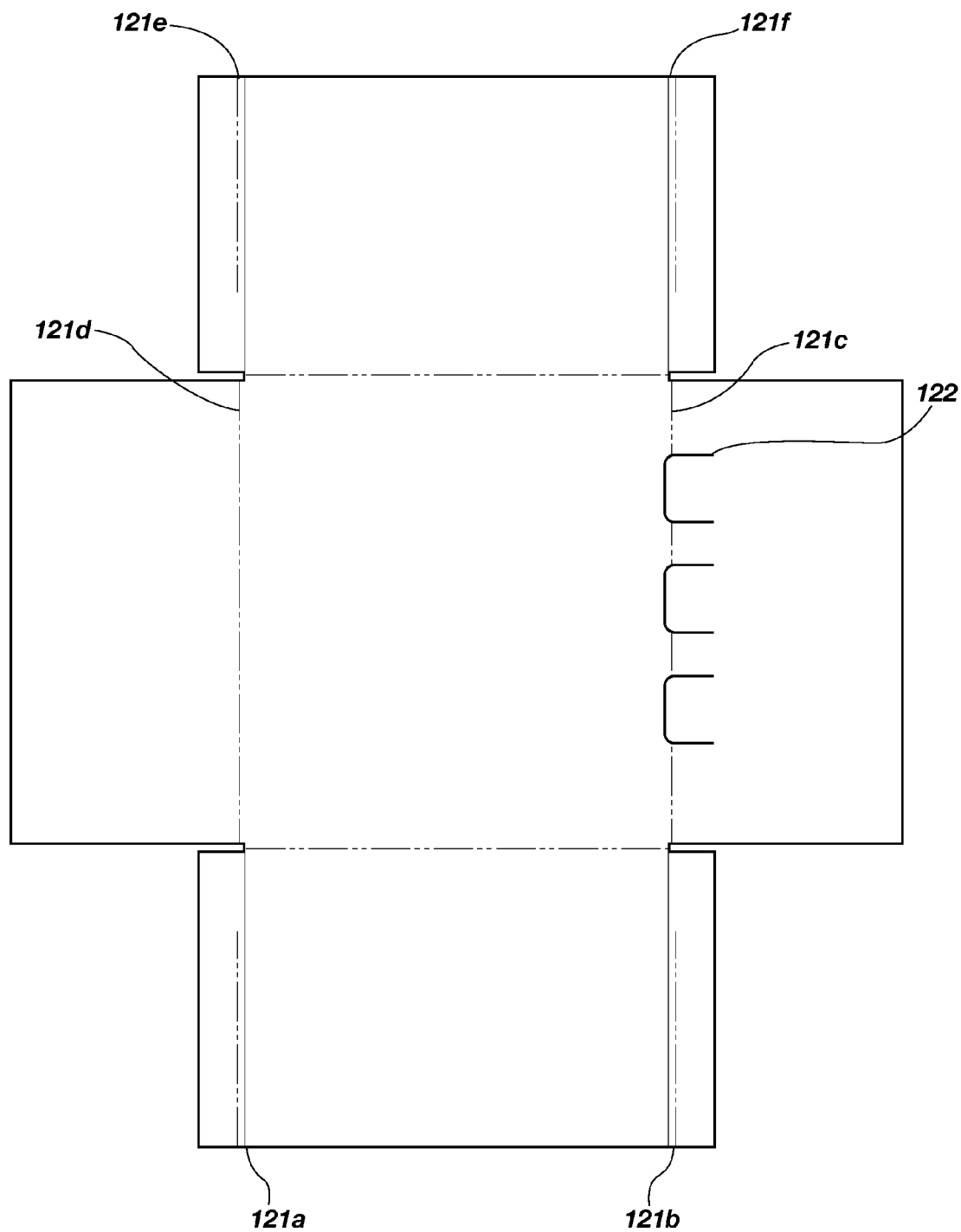
FIG. 12 illustrates an exemplary embodiment of a system for aligning items on a conveyor.

Referring to FIG. 12, a flattened unassembled container is shown with fold lines 121a-121e and conveyor feet 122 wherein the conveyor feet 122 can be provided in the unassembled state.

Figure 13:
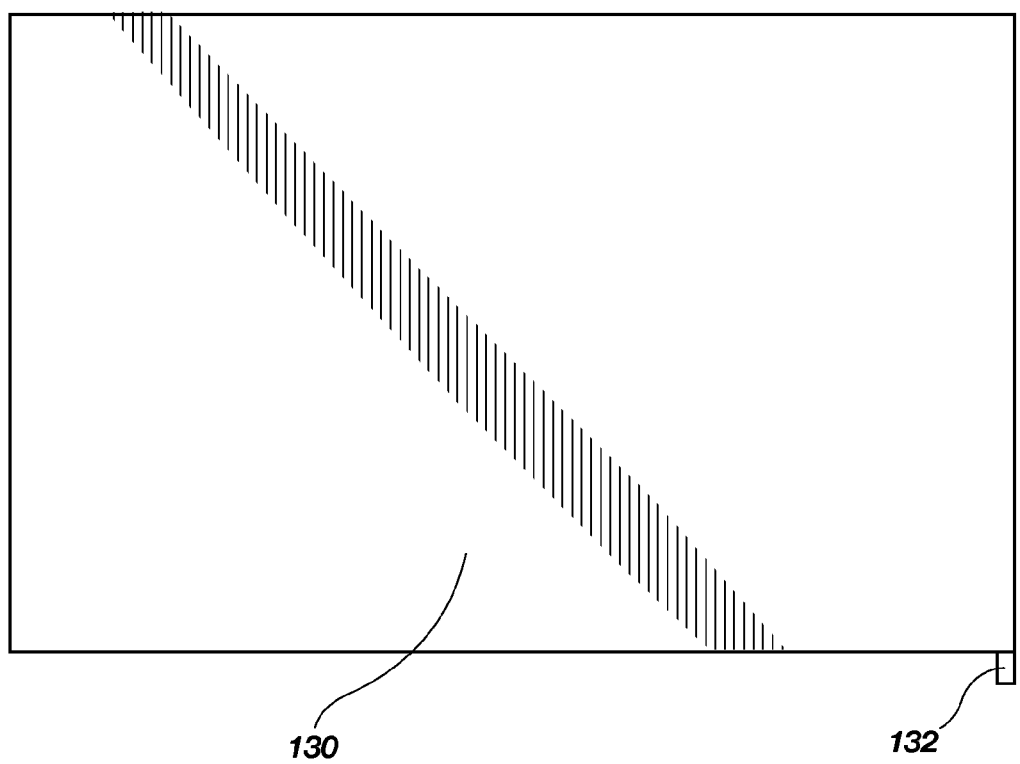
FIG. 13 illustrates an exemplary embodiment of a system for aligning items on a conveyor.

Referring to FIG. 13, a container 130 having conveyor feet 132 provided on one side of the container 130 is illustrated.

Figure 14:
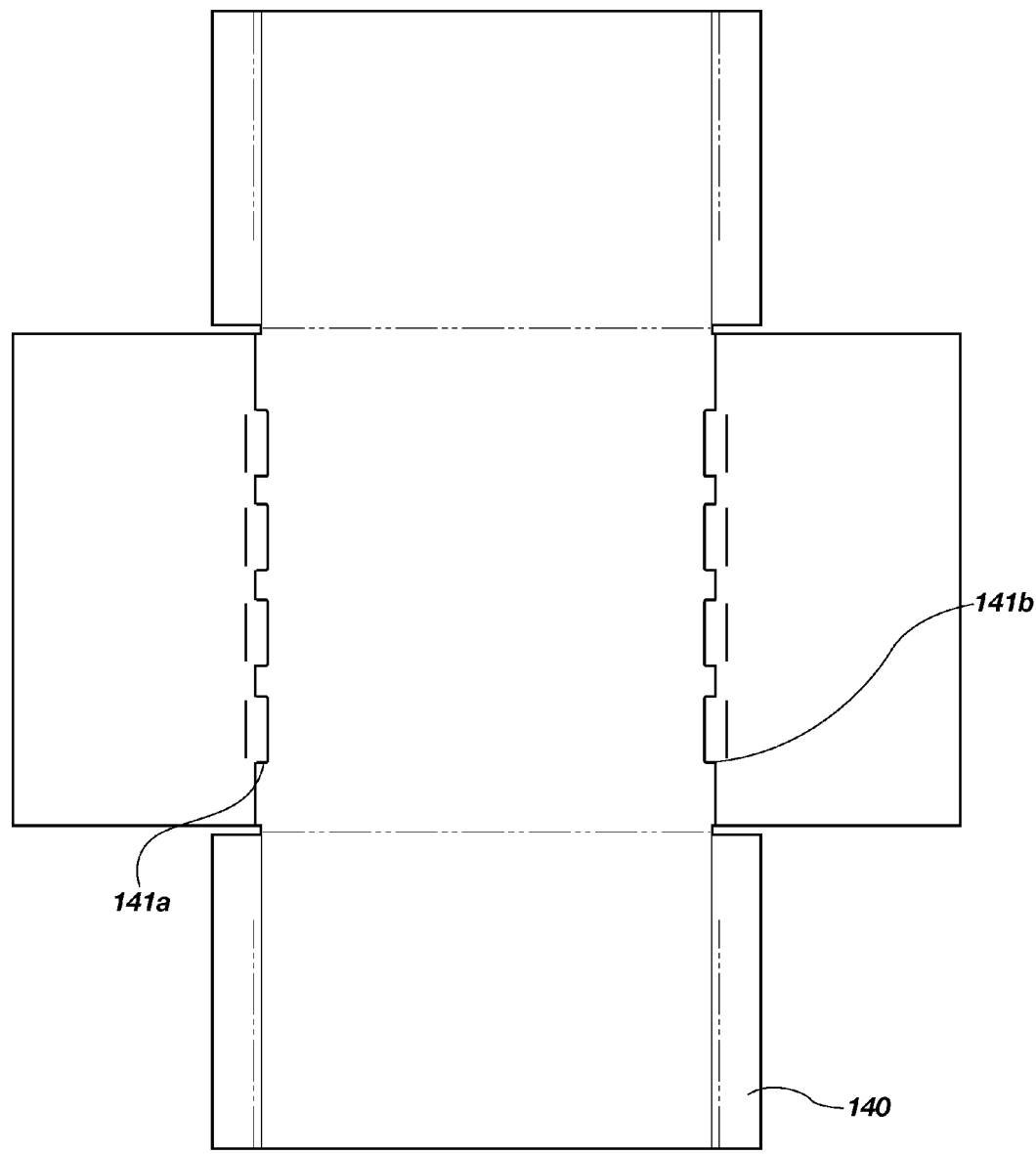
FIG. 14 illustrates an exemplary embodiment of a system for aligning items on a conveyor.

Referring to FIG. 14, a flattened unassembled container is shown with two sets of conveyor feet 141a-141b wherein the conveyor feet can be provided in the unassembled state.

Figure 15:
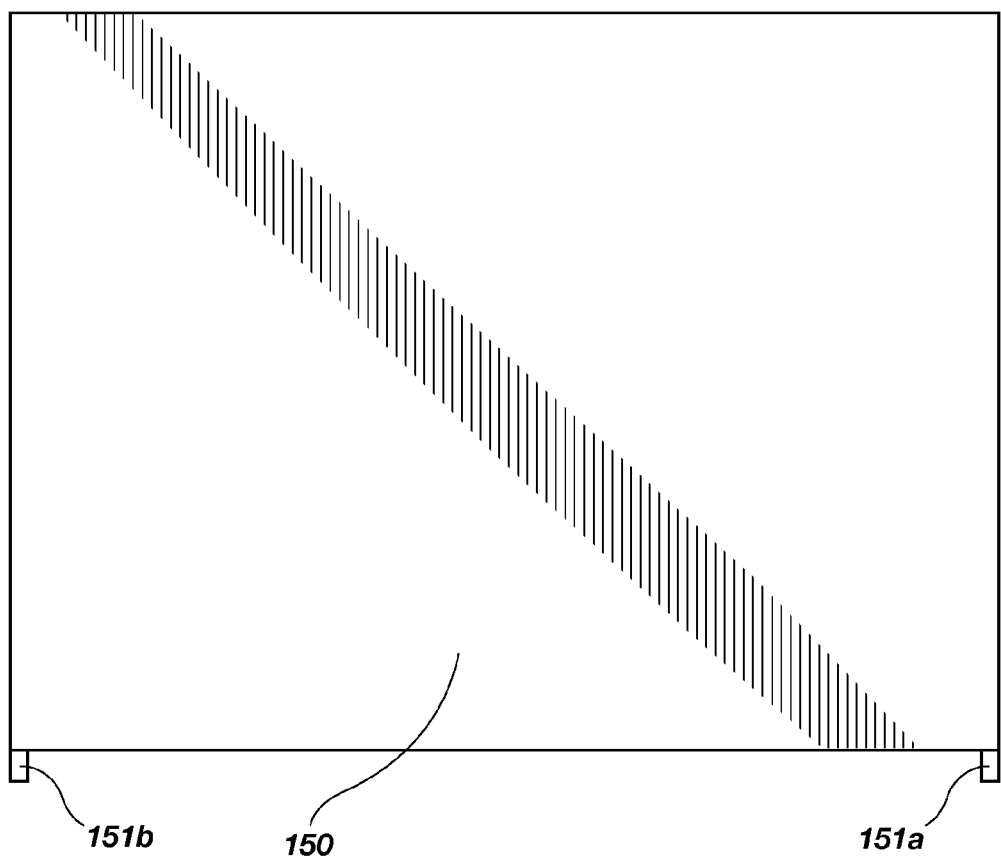
FIG. 15 illustrates an exemplary embodiment of a system for aligning items on a conveyor.

Referring to FIG. 15, a container 150 having conveyor feet 151a and 151b provided on two sides of the container 150 is illustrated as assembled from an embodiment shown in FIG. 14.

Figure 16:
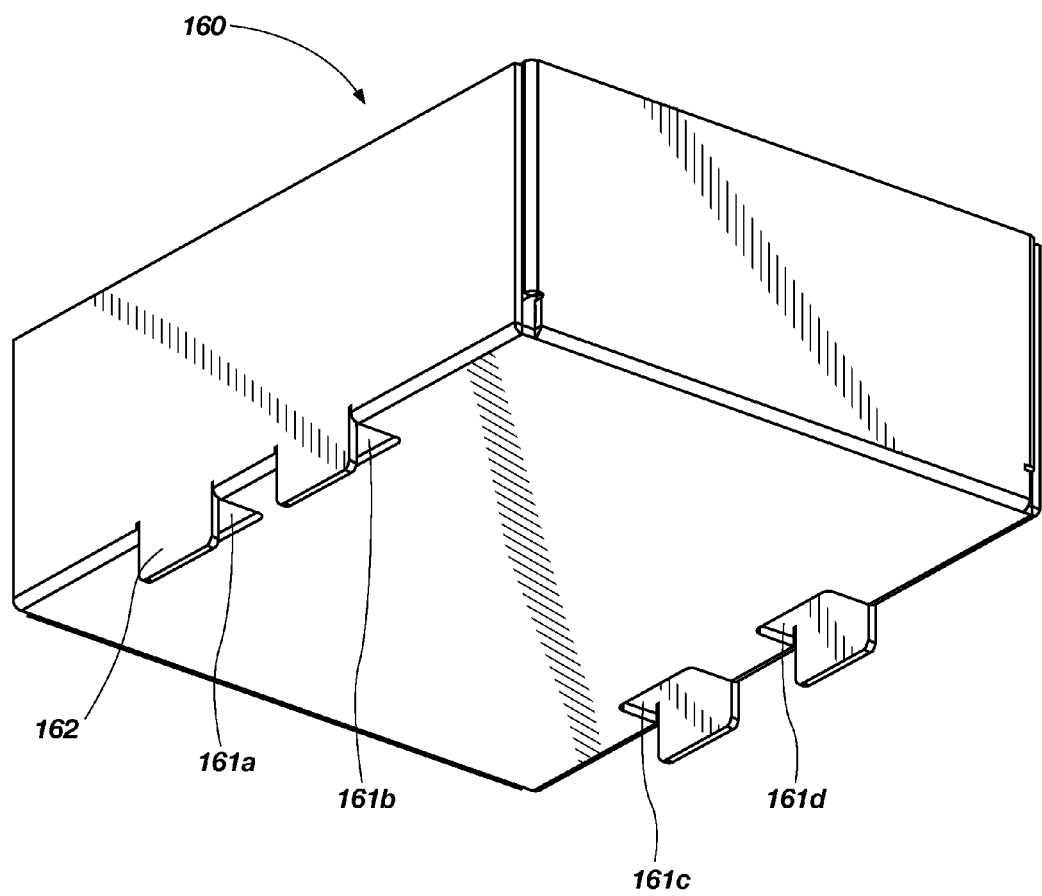
FIG. 16 illustrates an exemplary embodiment of a system for aligning items on a conveyor.

Referring to FIG. 16, a container 160 having conveyor feet 162 and openings 161a-d created when the conveyor feet 162 are folded. An opening may not be desirable and may be closed or sealed by such things as tape or preformed panels.

Figure 17:
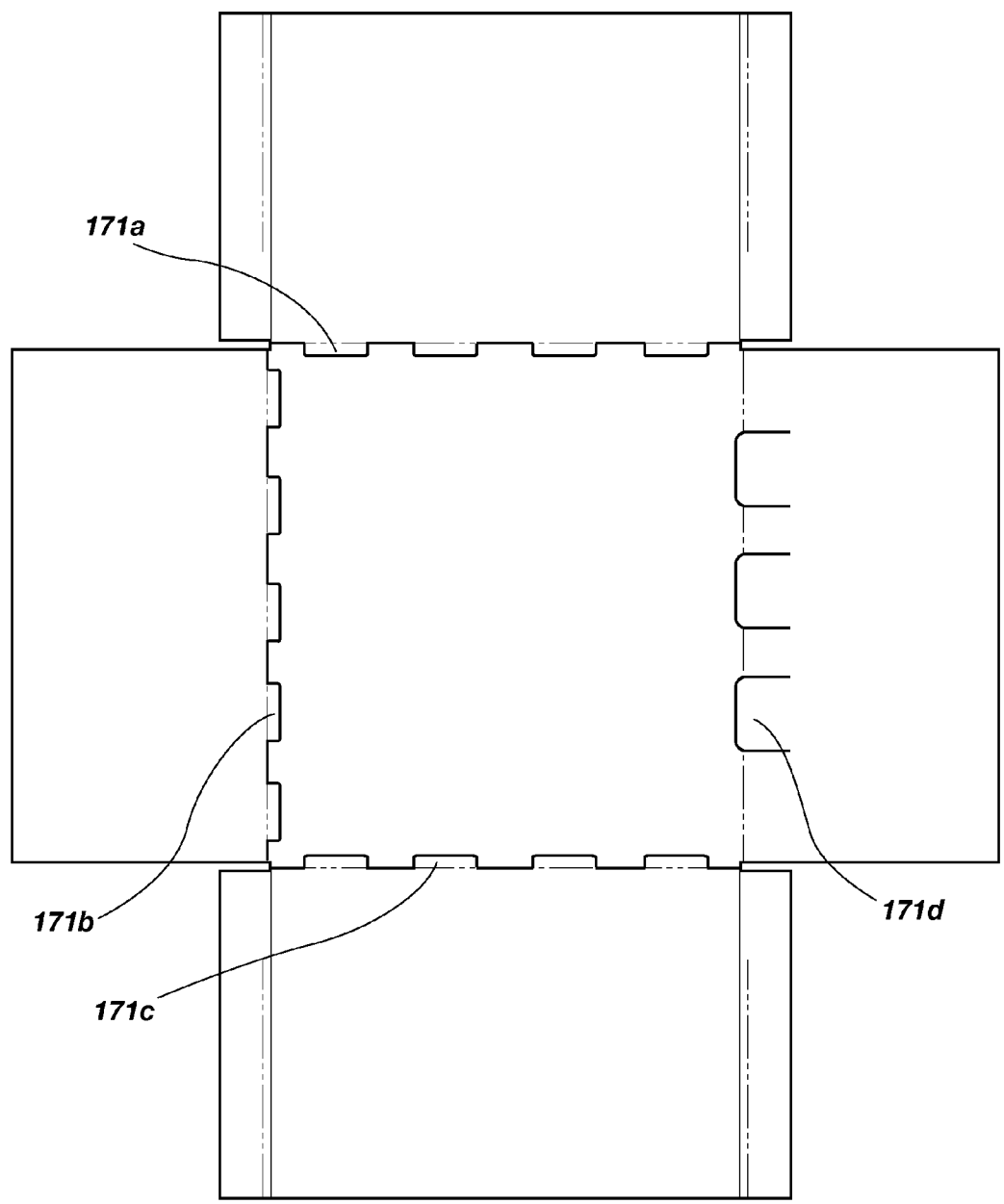
FIG. 17 illustrates an exemplary embodiment of a system for aligning items on a conveyor.

Referring to FIG. 17, a container 150 having conveyor feet 171a-d provided on four sides of the container 170 is illustrated in an unassembled state.

Figure 18:
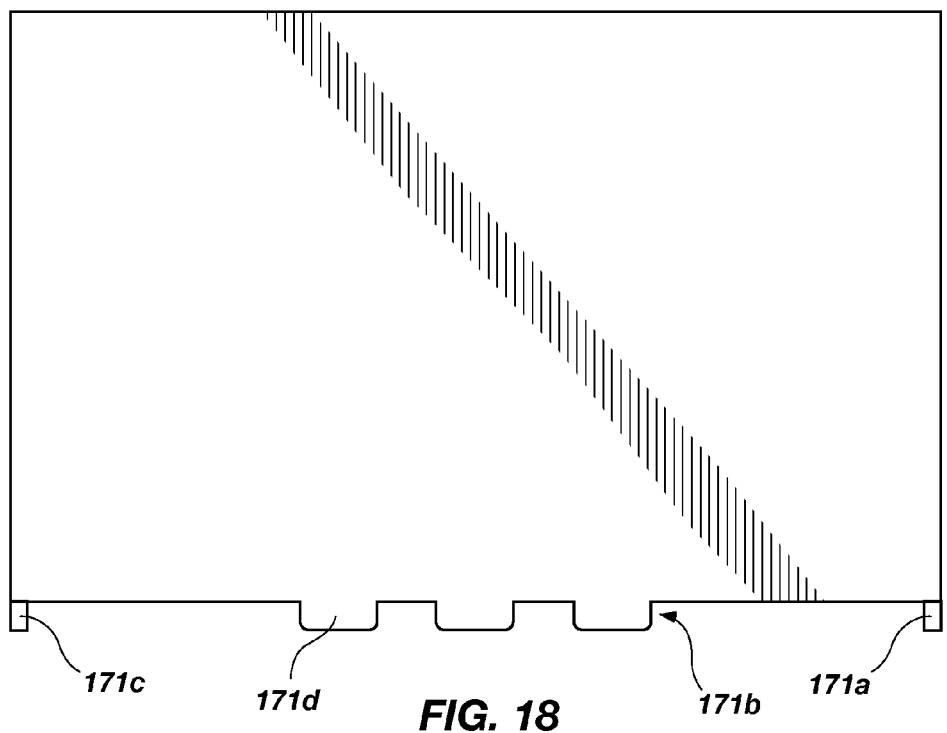
FIG. 18 illustrates an exemplary embodiment of a system for aligning items on a conveyor.

Referring to FIG. 18, a container 170 having conveyor feet 171a-d provided on four sides of the container 170 is illustrated in an assembled state. Conveyor feet 171b are represented with an arrow to show its placement behind conveyor feet 171d.

Figure 19:
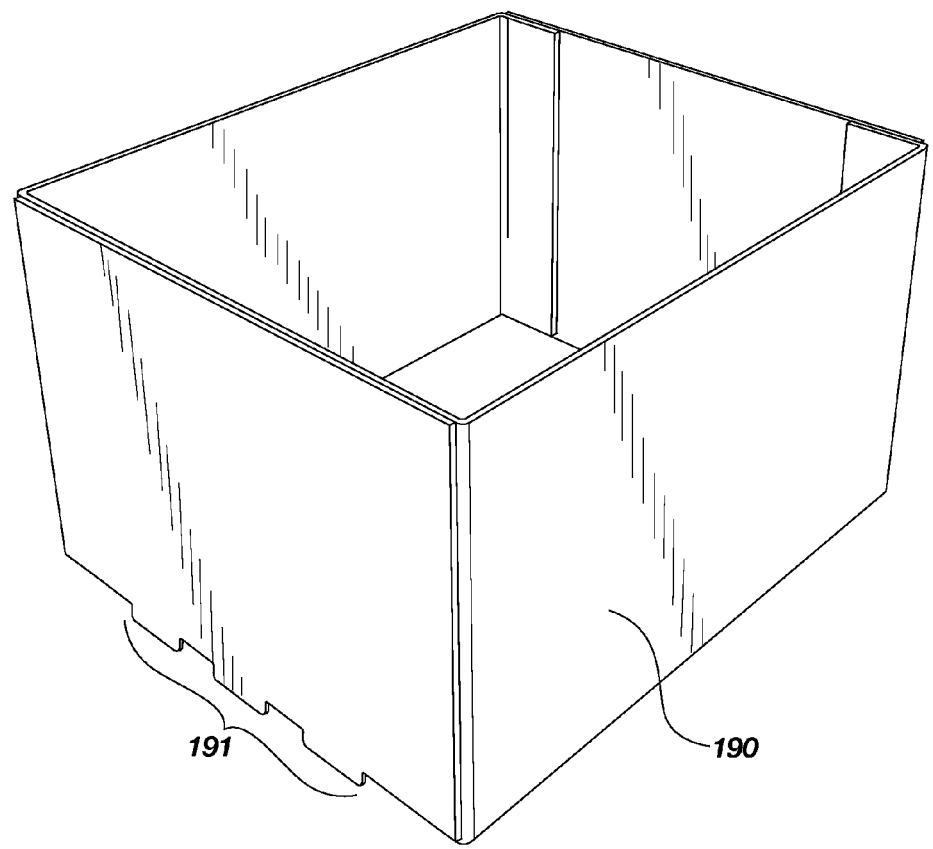
FIG. 19 illustrates an exemplary embodiment of a system for aligning items on a conveyor.

Referring to FIG. 19, a carton 190 having conveyor feet 191 on the side of the carton 190 is illustrated in an assembled state.

Figure 20:
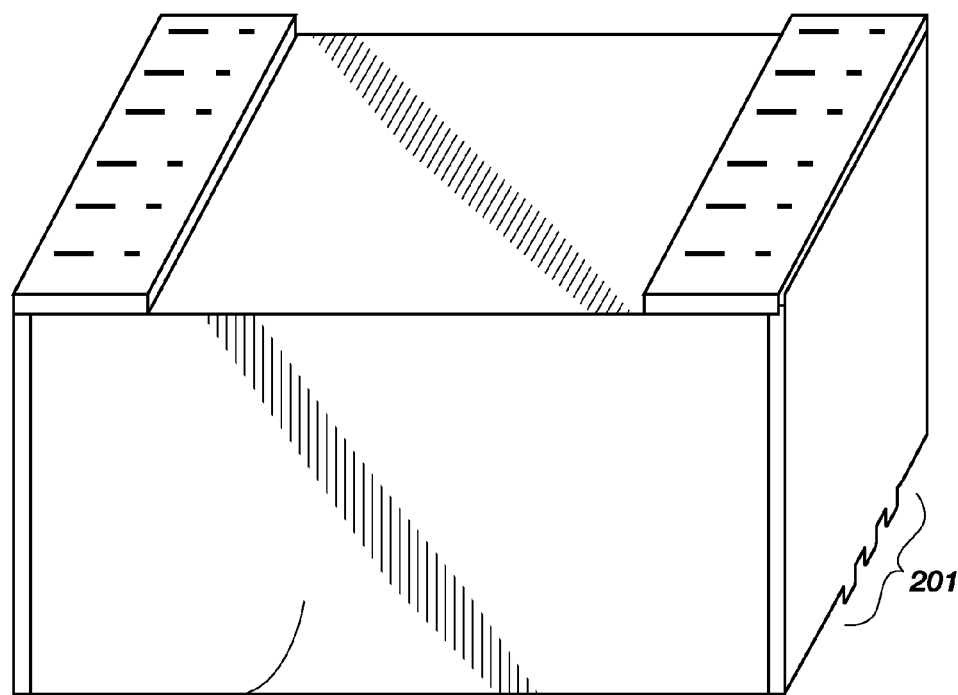
FIG. 20 illustrates an exemplary embodiment of a system for aligning items on a conveyor.

Referring to FIG. 20, a fold-over box 200 having conveyor feet 201 on the side of a fold-over box 200 is illustrated in an assembled state.

Figure 21:
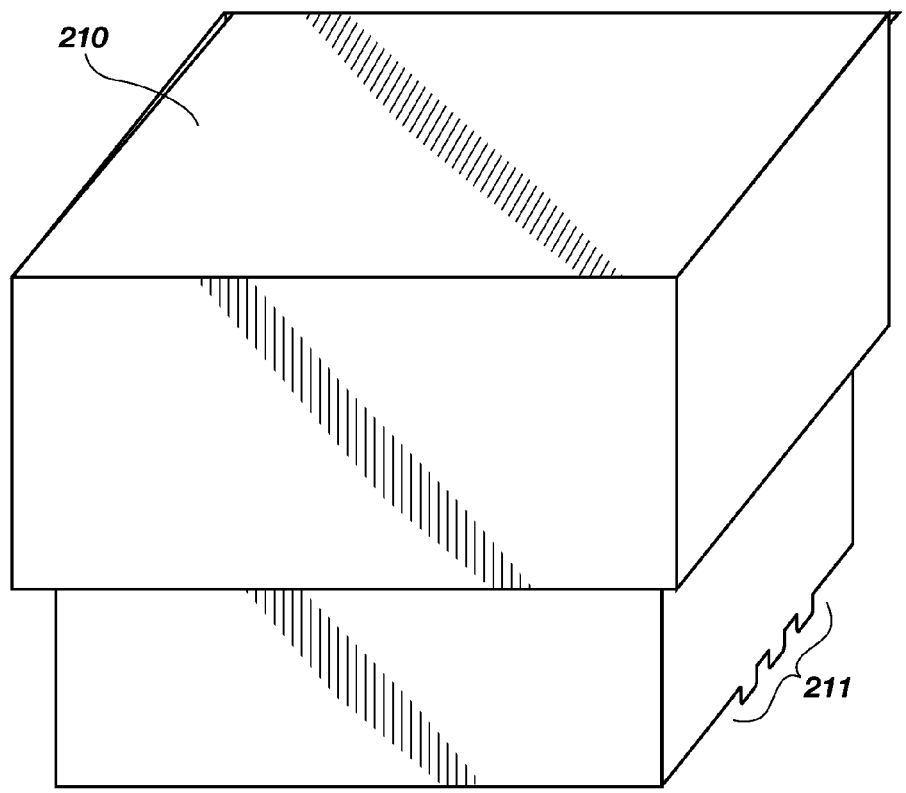
FIG. 21 illustrates an exemplary embodiment of a system for aligning items on a conveyor.

Referring to FIG. 21, a telescoping container 210 having conveyor feet 211 on the side of a telescoping container 210 is illustrated in an assembled state.

Figure 22:
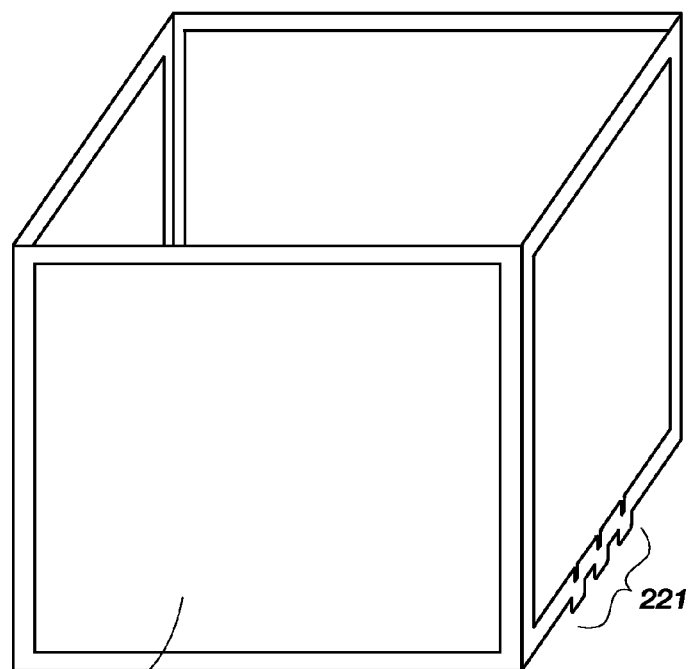
FIG. 22 illustrates an exemplary embodiment of a system for aligning items on a conveyor.

Referring to FIG. 22, a molded bin 220 having conveyor feet 221 on the side of a molded bin 210 is illustrated. The molded bin 220 may be of materials that provide their own rigidity and support for multiple use or single use.

It should be noted that conveyor feet may destruct during use, or they may be designed to survive use.

Figure 23:
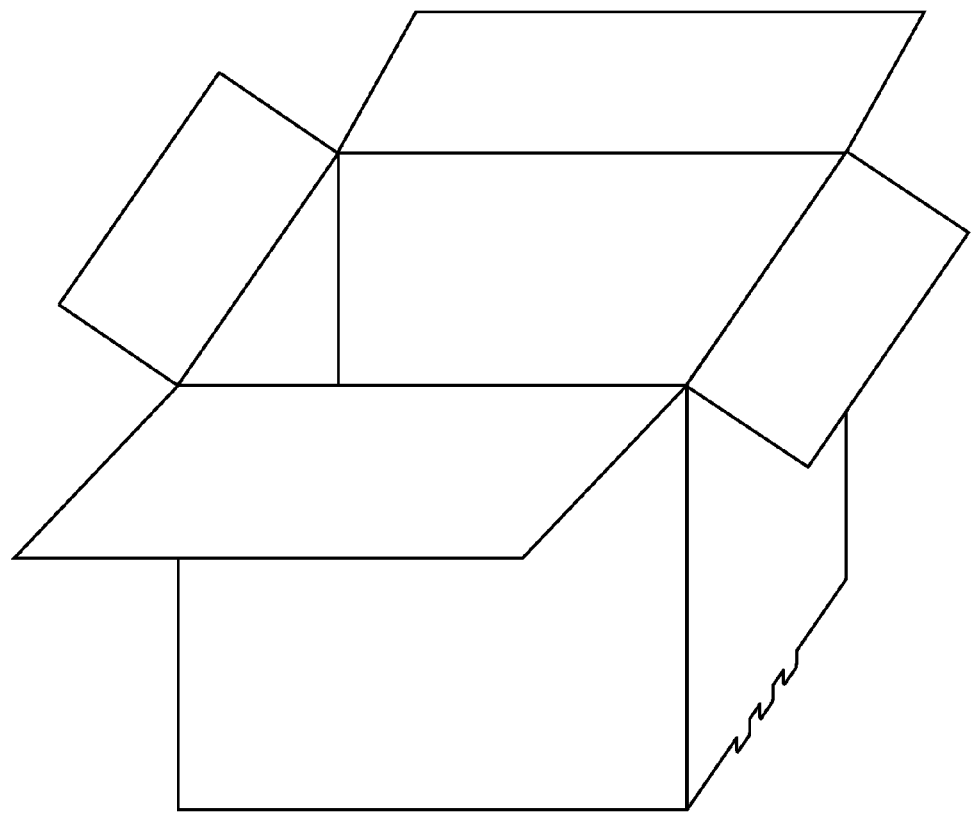
FIG. 23 illustrates an exemplary embodiment of a system for aligning items on a conveyor.

Referring to FIG. 23, a flapped box having conveyor feet on the side is illustrated in an assembled state.

Figure 24:
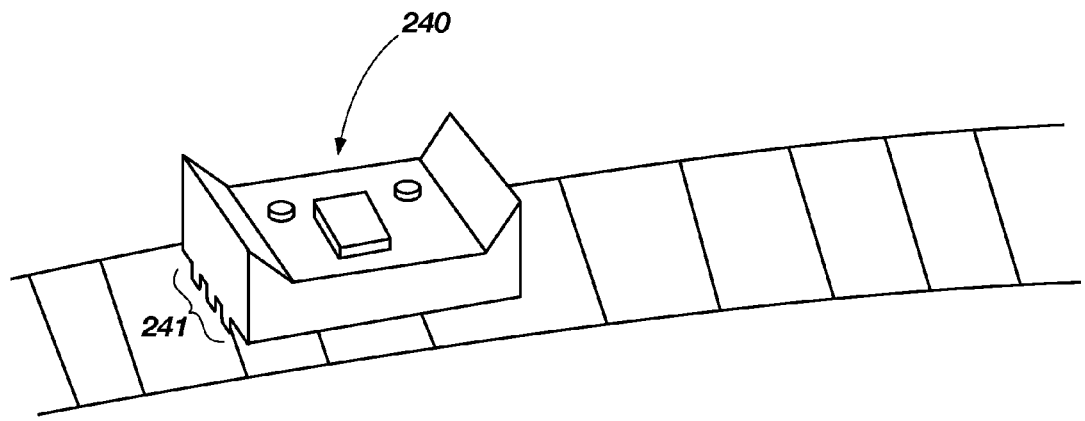
FIG. 24 illustrates an exemplary embodiment of a system for aligning items on a conveyor.

Referring to FIG. 24, an insert 240 having conveyor feet 241 on the side is illustrated on a conveyor and aligned by the conveyor feet 241. Inserts may be aligned with container for machine or manual placement within a container. Wherein alignment maybe maintained for the insert during product placement on the insert.

Figure 25:
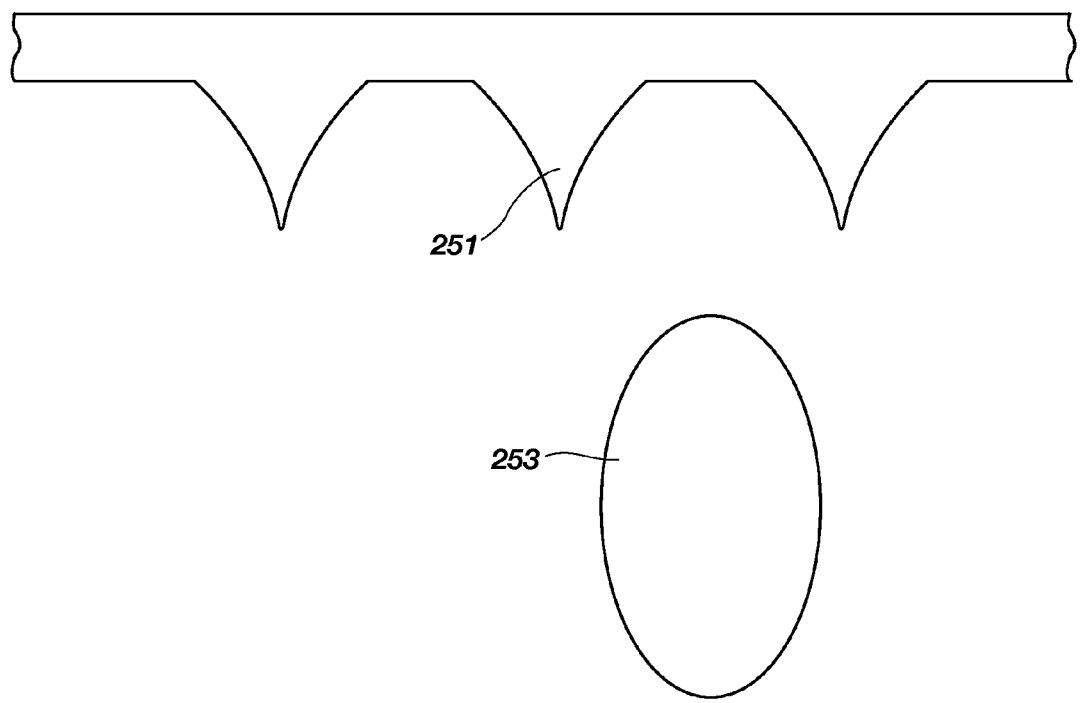
FIG. 25 illustrates an aspect of an exemplary embodiment of a system for aligning items on a conveyor.

Referring to FIG. 25, a conveyor foot 251 shape may be relative to the configuration of the roller 253. Roller 253 may have a diameter or radius and the conveyor foot or feet may be sized and shaped for optimal interaction.

Figure 26:
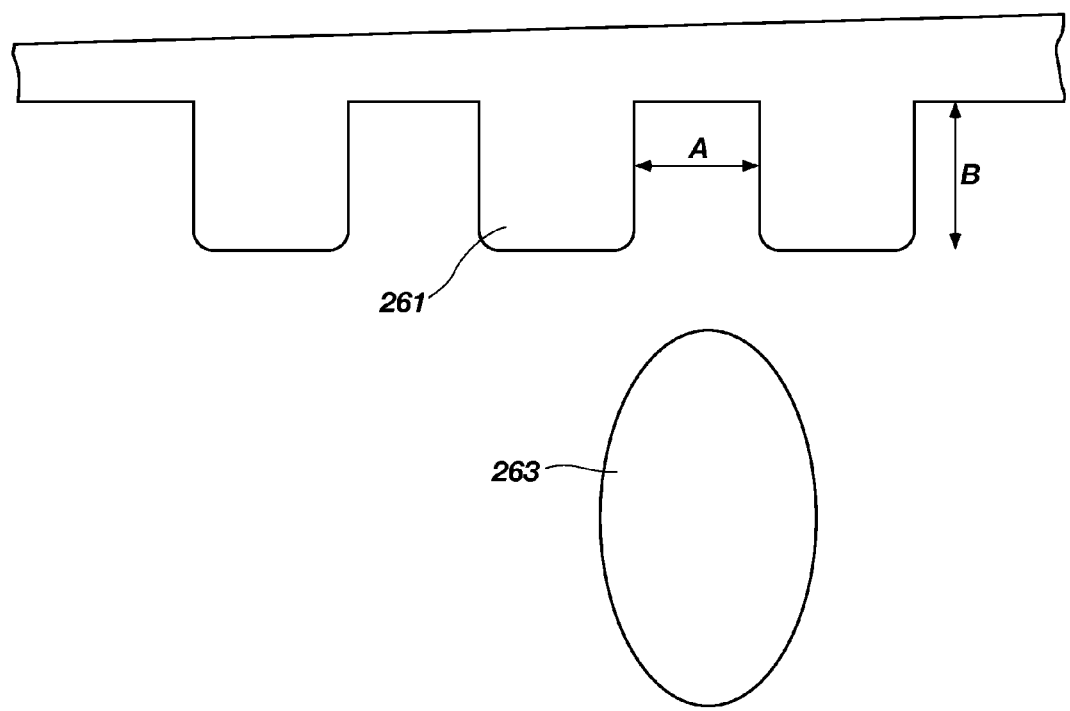
FIG. 26 illustrates an aspect of an exemplary embodiment of a system for aligning items on a conveyor.

Referring to FIG. 26, the spacing of the conveyor feet 261 relative to roller 263 size is illustrated wherein a and b are relative to the diameter of the roller. Roller 263 may have a diameter or radius and the conveyor foot or feet may be sized and shaped for optimal interaction.

Figure 27:
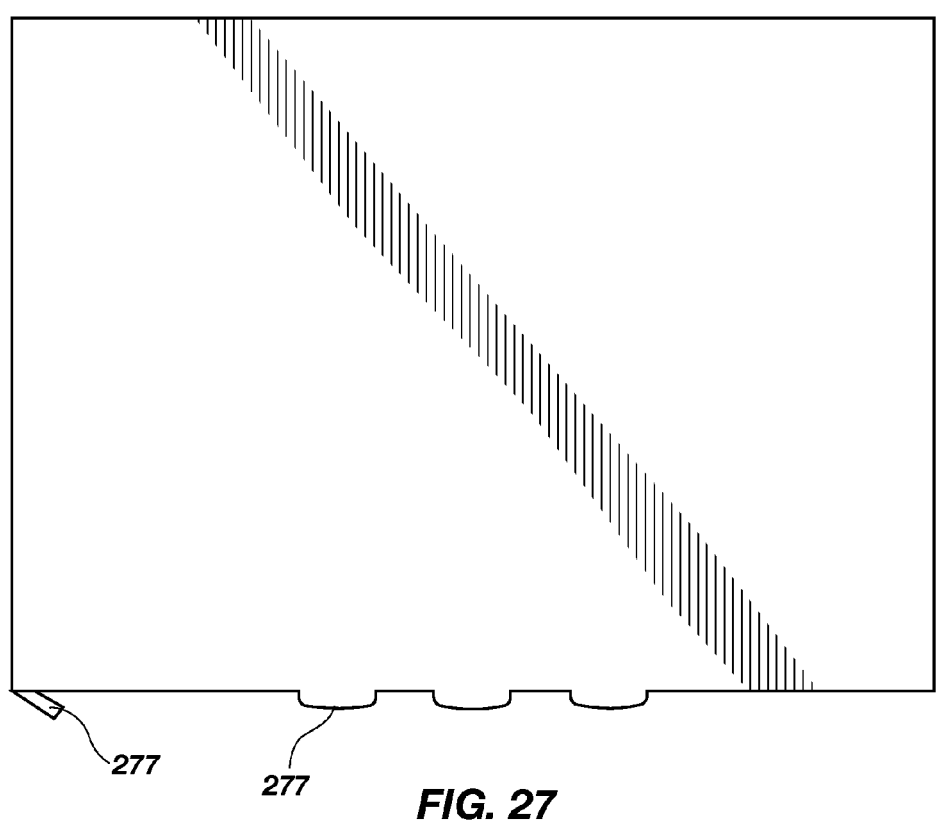
FIG. 27 illustrates an exemplary embodiment of a system for aligning items on a conveyor.

Referring to FIG. 27, destructed or softened conveyor feet 277 are illustrated on multiple sides of the container.

Figure 28:
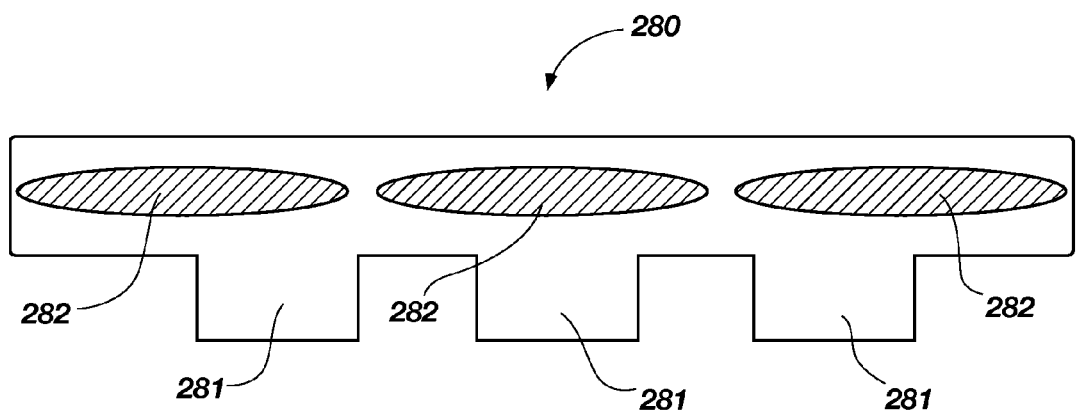
FIG. 28 illustrates an exemplary embodiment of a system for aligning items on a conveyor.

Referring to FIG. 28, a conveyor foot structure 280 is illustrated wherein the conveyor foot 281 may be attached to a container and is not part of the container when unassembled. Adhesives, 282 may be provided for removably or permanently attaching the conveyor foot structure 281 to the container.

Figure 29:
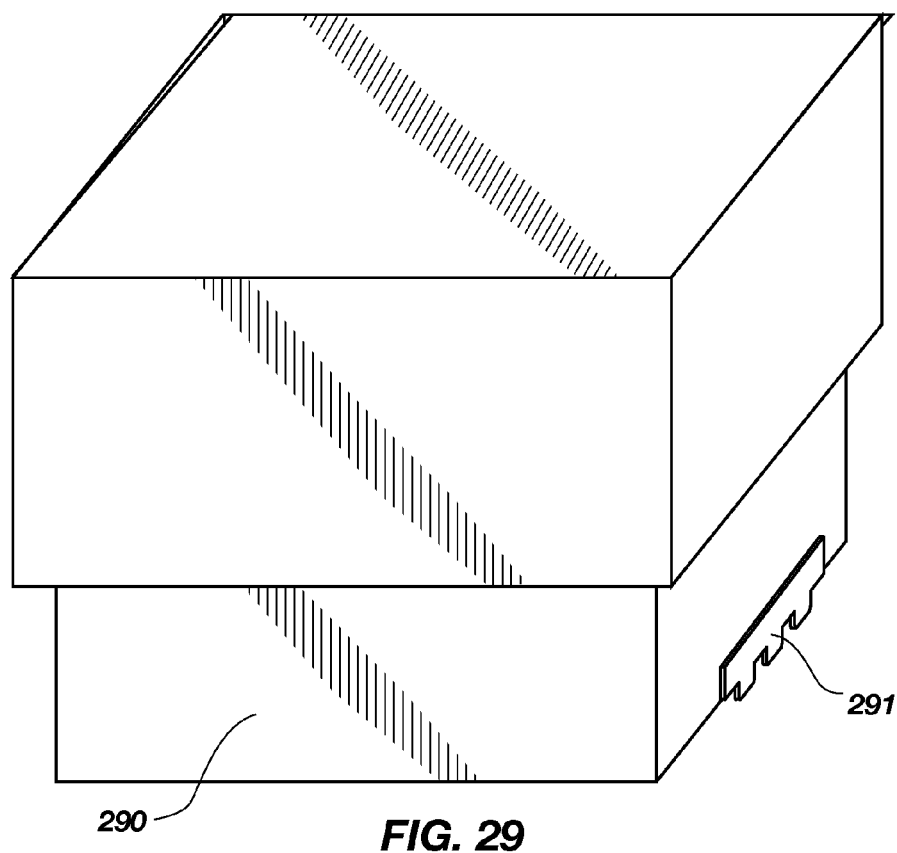
FIG. 29 illustrates an exemplary embodiment of a system for aligning items on a conveyor.

Referring to FIG. 29, a conveyor foot is illustrated wherein the conveyor foot structure 291 is attached to a container 290 and with adhesives that may be provided for removably or permanently attaching the conveyor foot 291 to the container 290.

Figure 30:
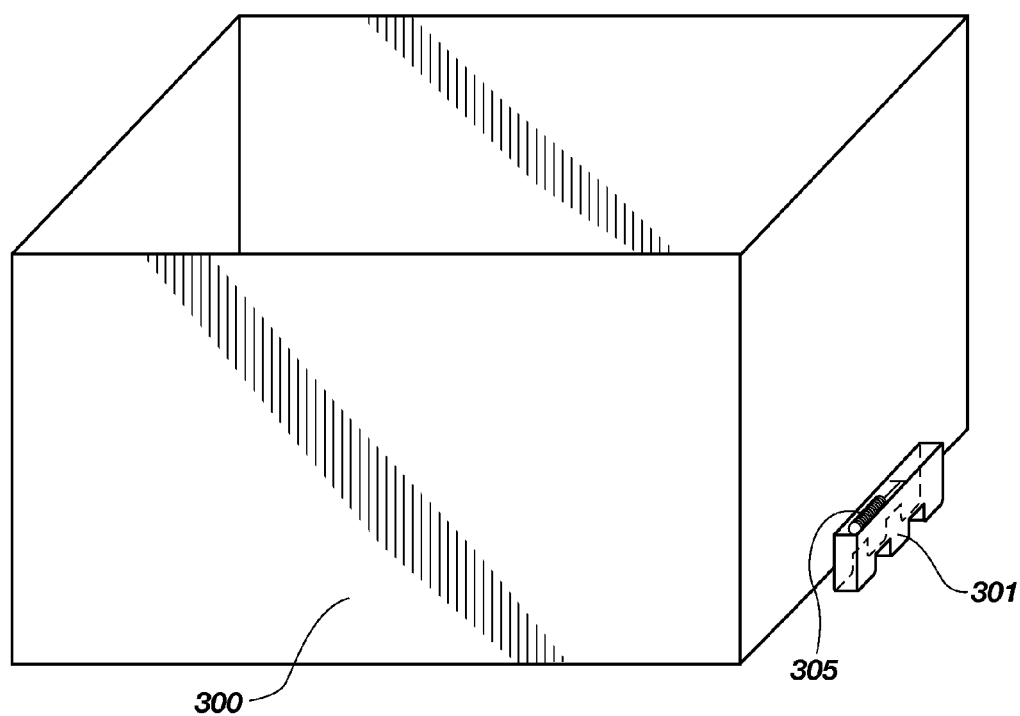
FIG. 30 illustrates an exemplary embodiment of a system for aligning items on a conveyor.

Referring to FIG. 30, a conveyor foot structure 301 is illustrated wherein the conveyor foot structure 301 is attached to a container 300 separately and further provides a transponder chip 305 for tracking. The conveyor foot may be attached with adhesives that may be provided for removably or permanently attaching the conveyor foot 301 to the container 300. The conveyor foot with the transponder may be reusable.

Figure 31:
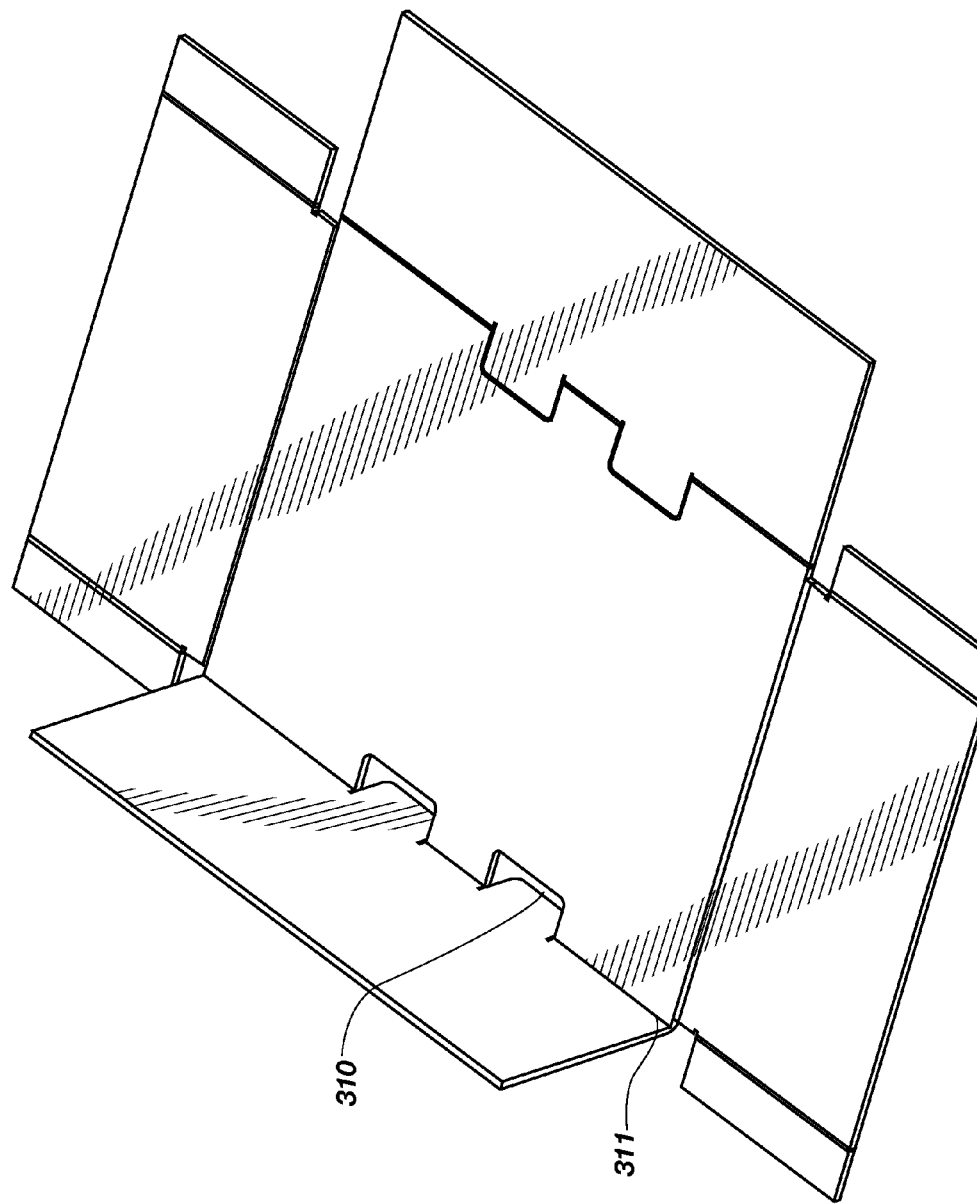
FIG. 31 illustrates an exemplary embodiment of a system for aligning items on a conveyor.

Referring to FIG. 31, a conveyor foot 310 is illustrated wherein the conveyor foot 310 is constructed during folding by interrupting the continuation of fold lines 311.

Figure 32:
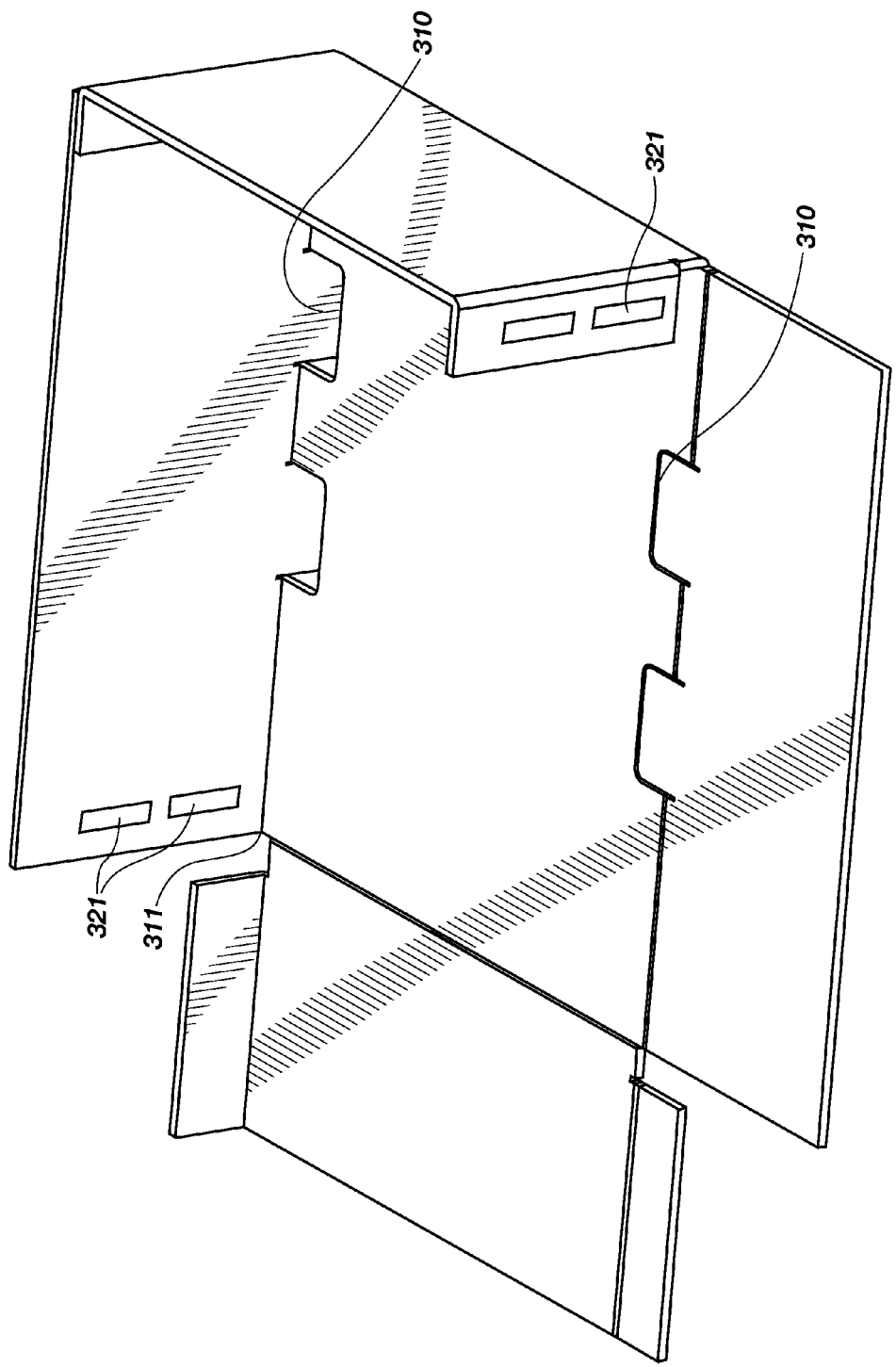
FIG. 32 illustrates an exemplary embodiment of a system for aligning items on a conveyor.

Referring to FIG. 32, a conveyor foot 310 is illustrated wherein the conveyor foot 310 is constructed during folding by interrupting the continuation of fold lines 311. Furthermore, adhesives 321 or other fixing device may be added to the embodiment.

Figure 33:
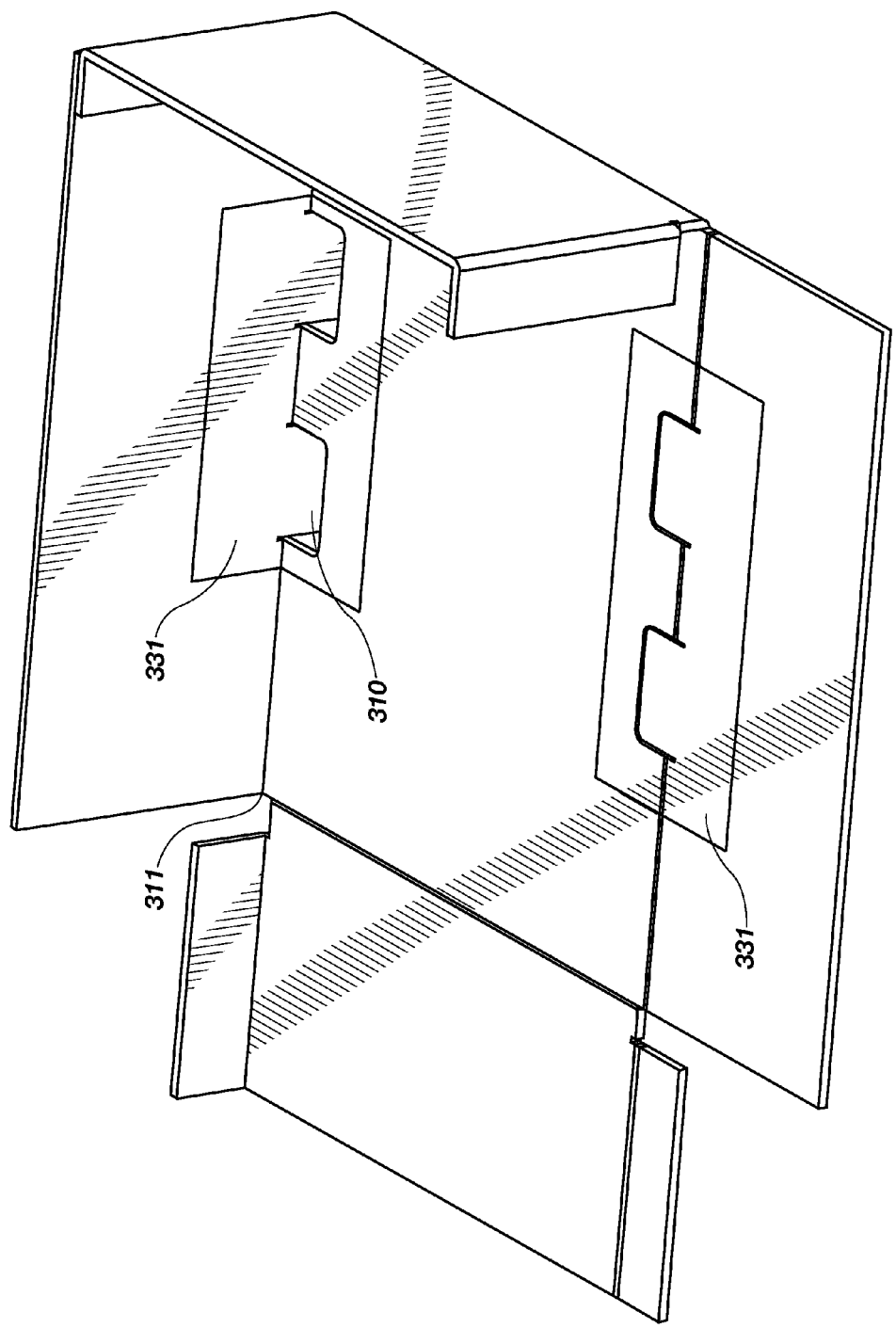
FIG. 33 illustrates an exemplary embodiment of a system for aligning items on a conveyor.

Referring to FIG. 33, a conveyor foot 310 is illustrated wherein the conveyor foot 310 is constructed during folding by interrupting the continuation of fold lines 311. Furthermore, sealers 331 may be added before or after assembly.

Figure 34:
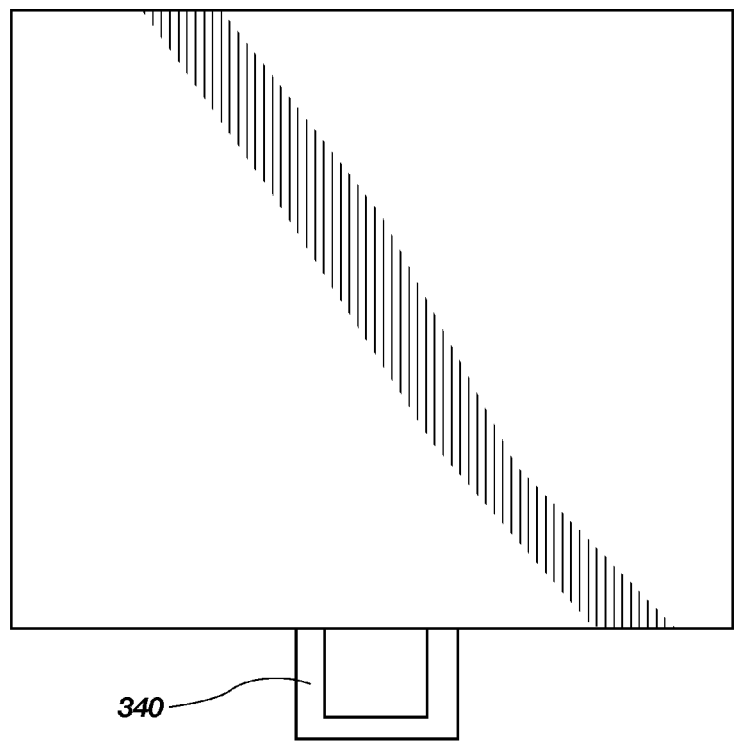
FIG. 34 illustrates an exemplary embodiment of a system for aligning items on a conveyor; and, FIG. 35 illustrates an exemplary embodiment of a system for aligning items on a conveyor.

Referring to FIG. 34, a conveyor hook 340 is illustrated wherein the conveyor hook 340 is constructed during folding by interrupting the continuation of fold lines. Furthermore, sealers 340 may be used with a pulling and hooking system of conveyance.

Figure 35:
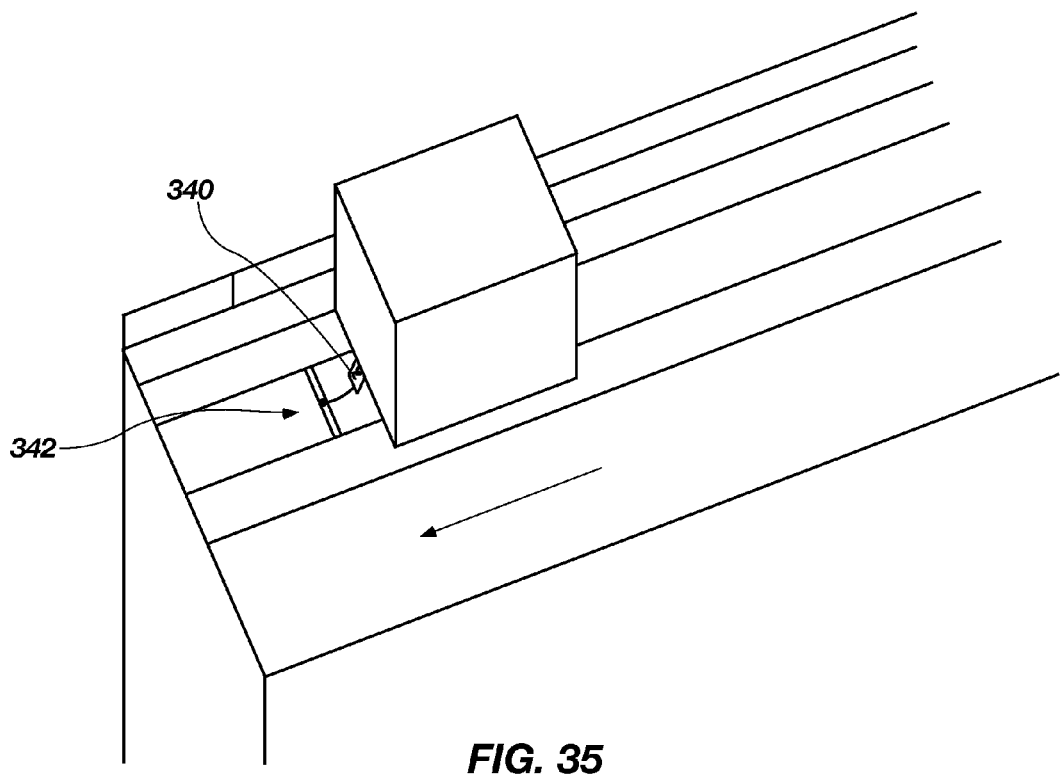

Referring to FIG. 35, a conveyor hook 340 is illustrated wherein the conveyor hook 340 is constructed during folding by interrupting the continuation of fold lines. Furthermore, feet 340 may be used with a pulling and hooking system 342 conveyance.

An embodiment may have an apparatus for aligning items on a conveyor having a protrusion for interacting with a structure on a conveyance such that the item is aligned in a predetermined fashion for providing an advantage for use, and may further have the a plurality of protrusions. The embodiment may further have an adhesive for attaching the apparatus to the item.

An embodiment may be a system for conveying items on a conveyance having: a conveyor; a container for moving along the conveyance; a protrusion from the container for interacting with the conveyor thereby providing alignment. The embodiment may further have a protrusion is attached to the container. The embodiment may further have a plurality of protrusions for interacting with the conveyor. The embodiment may further have a packaging insert for inserting into the container.

An embodiment may have a container having a protrusion from the container for interacting with a conveyor thereby providing alignment. An embodiment may have container having a protrusion for providing alignment. An embodiment may have container insert having a protrusion for providing alignment. An embodiment may have a method of aligning items on a conveyor having the processes of having a protrusion interact with a structure of a conveyance thereby providing alignment. An embodiment may have a method of aligning an item on a conveyor having the process of erecting a protrusion on the item for providing alignment of the item.

An embodiment may have a method of constructing a package assembly having aligning a container on a conveyor by a protrusion and placing an item in the container. An embodiment may have a method of constructing a package assembly as defined above further having aligning the item with a protrusion. An embodiment may have a method of constructing a package assembly as defined above wherein the aligning is done with a plurality of protrusions.

An embodiment may have a system for packaging items having: a container; a conveyor for moving the container; an alignment structure configured to correspond to the container and to the conveyor; a container identifier; a scanner for scanning the container identifier and wherein the alignment structure causes and interaction between the container and the conveyor such that the identifier is aligned with the scanner for scanning.

An embodiment may have the system described above wherein the alignment structure is a protrusion for interacting with a structure on a conveyance such that the item is aligned in a predetermined fashion for providing an advantage for use. An embodiment may have the system described above further having a plurality of protrusions. An embodiment may have the system described above wherein the protrusions are spaced to correspond with the conveyor. An embodiment may have the system described above wherein the protrusions are sized to correspond with the conveyor. An embodiment may have the system described above wherein the alignment structures are configured to destruct as the container moves along the conveyor. An embodiment may have the system described above further having a packing insert for inserting into the container.

An embodiment may have the system described above further having an insert alignment structure for aligning the insert. An embodiment may have the system described above wherein the insert alignment structure is a protrusion for interacting with a structure on a conveyance such that the item is aligned in a predetermined fashion for providing an advantage for use. An embodiment may have the system described above further having a plurality of protrusions. An embodiment may have the system described above wherein the protrusions are spaced to correspond with the conveyance. An embodiment may have the system described above wherein the protrusions are sized to correspond with the conveyance. An embodiment may have the system described above wherein the insert alignment structure is configured to destruct as the insert moves along the conveyance. An embodiment may have the system described above wherein the container haves four bounding walls and a bottom forming a space therein. An embodiment may have the system described above wherein the alignment structure protrudes from one of the walls. An embodiment may have the system described above wherein a plurality of alignment structures protrude from a plurality of the walls. An embodiment may have the system described above wherein the container is sealed against moister and particles.

An embodiment may have a method of making a container for conveying along a conveyor wherein a user is: providing an unerected container in a generally planar form; providing fold lines in the unerected container for defining folds during a process of erection; providing slots defining alignment structures such that when a process of erection is performed the alignment structures are formed; performing a process of erection having the process of folding the generally planar form along the fold lines such that an erected container is formed having alignment structures protruding therefrom.

Those having ordinary skill in the relevant art will appreciate the advantages provided by the features of the present disclosure.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A container comprising:
    a protrusion provided on said container for interacting with a conveyor thereby providing alignment, wherein the protrusion extends outwardly beyond physical boundaries defining the container.
2. A container comprising:
    a protrusion for providing alignment on a conveyor, wherein the protrusion extends outwardly beyond physical boundaries defining the container.
3. A container insert comprising:
    a protrusion for providing alignment on a conveyor, wherein the protrusion extends outwardly beyond physical boundaries defining the container.

* * * * *